(12) United States Patent
Nandakumar

(10) Patent No.: US 11,948,003 B2
(45) Date of Patent: Apr. 2, 2024

(54) SYSTEM AND METHOD FOR AUTOMATED PRODUCTION AND DEPLOYMENT OF PACKAGED AI SOLUTIONS

(71) Applicant: RazorThink, Inc., Redwood City, CA (US)

(72) Inventor: Purushottaman Nandakumar, Suwanee, GA (US)

(73) Assignee: RazorThink, Inc., Redwood City, CA (US)

( * ) Notice: Subject to any disclaimer, the term of this patent is extended or adjusted under 35 U.S.C. 154(b) by 491 days.

(21) Appl. No.: 17/386,248

(22) Filed: Jul. 27, 2021

(65) Prior Publication Data

US 2022/0138004 A1    May 5, 2022

Related U.S. Application Data

(63) Continuation-in-part of application No. 17/089,686, filed on Nov. 4, 2020, now Pat. No. 11,074,107.

(51) Int. Cl.

| | |
|---|---|
| *G06F 9/46* | (2006.01) |
| *G06F 8/10* | (2018.01) |
| *G06F 8/34* | (2018.01) |
| *G06F 9/48* | (2006.01) |
| *G06N 20/00* | (2019.01) |

(52) U.S. Cl.
CPC .............. *G06F 9/4881* (2013.01); *G06F 8/10* (2013.01); *G06F 8/34* (2013.01); *G06N 20/00* (2019.01)

(58) Field of Classification Search
CPC .................................................. G06F 9/4881
USPC .......................................................... 718/102
See application file for complete search history.

(56) References Cited

U.S. PATENT DOCUMENTS

| | | | |
|---|---|---|---|
| 11,445,035 B2 * | 9/2022 | Duggal ................... H04L 67/34 |
| 11,620,582 B2 * | 4/2023 | Chen ...................... G06N 20/20 |
| | | | 706/12 |
| 11,727,314 B2 * | 8/2023 | Bansal .................... G06F 9/546 |
| | | | 706/12 |
| 11,748,653 B2 * | 9/2023 | Talagala .............. G06F 18/2178 |
| | | | 706/12 |

(Continued)

*Primary Examiner* — Mehran Kamran
(74) *Attorney, Agent, or Firm* — Gregory Finch; Finch Paolino, LLC

(57) ABSTRACT

A data processing method and system for automated construction, resource provisioning, data processing, feature generation, architecture selection, pipeline configuration, hyperparameter optimization, evaluation, execution, production, and deployment of machine learning models in an artificial intelligence solution development lifecycle. In accordance with various embodiments, a graphical user interface of an end user application is configured to provide a pre-configured template comprises an automated ML framework for data import, data preparation, data transformation, feature generation, algorithms selection, hyperparameters tuning, models training, evaluation, interpretation, and deployment to an end user. A configurable workflow is configured to enable a user to assemble one or more transmissible AI build/products containing one or more pipelines and/or ML models for executing one or more AI solutions. Embodiments of the present disclosure may enable full serialization and versioning of all entities relating to an AI build/product for deployment within an enterprise architecture.

20 Claims, 16 Drawing Sheets

(56) References Cited

U.S. PATENT DOCUMENTS

| | | | |
|---|---|---|---|
| 2012/0030646 A1* | 2/2012 | Ravindran | G06F 9/4494 717/105 |
| 2015/0186794 A1* | 7/2015 | Singer | G06N 20/00 706/12 |
| 2015/0379429 A1* | 12/2015 | Lee | G09B 5/00 706/11 |
| 2016/0358101 A1* | 12/2016 | Bowers | G06N 20/00 |
| 2017/0124487 A1* | 5/2017 | Szeto | G06F 11/1448 |
| 2019/0265971 A1* | 8/2019 | Behzadi | H04L 67/61 |
| 2020/0372307 A1* | 11/2020 | Arun | G06F 18/2178 |
| 2021/0081720 A1* | 3/2021 | Polleri | G06F 16/9024 |
| 2021/0081819 A1* | 3/2021 | Polleri | G06N 5/022 |
| 2021/0110288 A1* | 4/2021 | Poothiyot | G06F 8/20 |
| 2021/0192394 A1* | 6/2021 | McKay | G06N 3/091 |
| 2022/0121477 A1* | 4/2022 | Chivukula | G06F 8/34 |
| 2022/0121988 A1* | 4/2022 | Margineantu | G06N 20/10 |
| 2022/0138004 A1* | 5/2022 | Nandakumar | G06N 20/00 718/102 |
| 2022/0261413 A1* | 8/2022 | Jones | G06F 16/254 |
| 2022/0391199 A1* | 12/2022 | Ashrafzadeh | G06F 8/71 |
| 2023/0083891 A1* | 3/2023 | Achin | G06F 40/18 715/762 |
| 2023/0099502 A1* | 3/2023 | Fix | G06N 5/022 706/12 |
| 2023/0108560 A1* | 4/2023 | Wang | G06F 16/9024 717/109 |
| 2023/0129849 A1* | 4/2023 | Lazim | G06F 40/30 715/205 |
| 2023/0161945 A1* | 5/2023 | Vadapandeshwara | G06F 40/166 715/234 |
| 2023/0169352 A1* | 6/2023 | Zhao | G06N 3/10 706/15 |
| 2023/0196204 A1* | 6/2023 | McKay | G06N 20/00 706/12 |
| 2023/0214275 A1* | 7/2023 | Abhyankar | G06F 9/5077 718/1 |
| 2023/0259817 A1* | 8/2023 | Grayson | G06F 11/323 706/12 |
| 2023/0316100 A1* | 10/2023 | Saha | G06N 20/00 706/12 |
| 2023/0336340 A1* | 10/2023 | Polleri | G06F 18/213 |
| 2023/0336581 A1* | 10/2023 | Dunn | H04L 51/212 |
| 2023/0368070 A1* | 11/2023 | Bhargava | G16H 10/60 |
| 2023/0370393 A1* | 11/2023 | Da Jornada | H04L 51/02 |
| 2024/0005640 A1* | 1/2024 | Agarwal | G06V 30/414 |

* cited by examiner

SYSTEM AND METHOD FOR AUTOMATED PRODUCTION AND DEPLOYMENT OF PACKAGED AI SOLUTIONS

CROSS-REFERENCE TO RELATED APPLICATIONS

This application is a continuation-in-part of U.S. application Ser. No. 17/089,686 filed Nov. 4, 2020, and entitled, "DATA PROCESSING SYSTEM AND METHOD FOR MANAGING AI SOLUTIONS DEVELOPMENT LIFECYCLE"; the entirety of which is incorporated herein at least by virtue of this reference.

FIELD

The present disclosure relates to the field of artificial intelligence type computers and digital data processing systems and corresponding data processing methods and products for emulation of intelligence, machine learning systems, and artificial neural networks; in particular, a data processing method and system for automated construction, resource provisioning, data processing, feature generation, architecture selection, pipeline configuration, hyperparameter optimization, evaluation, execution, production, and deployment of machine learning models in an artificial intelligence solution development lifecycle.

BACKGROUND

The subject matter discussed in this section should not be assumed to be prior art merely because of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Artificial intelligence ("AI") and machine learning ("ML") are powering the data-driven advances that are transforming industries worldwide. Commercial enterprises and businesses are racing to leverage AI and ML as a competitive advantage to deliver innovation ranging from the development of new therapies in life sciences to risk management in financial services to the personalization of online customer experiences. ML systems are used to execute workloads that include numerical computing frameworks and libraries, ML algorithm libraries, and specialized systems for deep neural networks and distributed ML. ML is evolving into a core approach for solving complex real-world problems and delivering value in these domains through data science; however, the focus of these systems is primarily on efficient model training and scoring.

Data science is a basic theory about extracting information and knowledge from data. Data science uses statistics, data analysis, ML, and related methods to understand and analyze real/actual phenomena through data. In contrast to traditional analytics, the aim of data science is to be predictive for producing transformative insights using AI and ML. As such, it requires vast amounts of data, often in real-time. The typical data science process is exploratory, experimental, and ad hoc, whereby a data scientist poses an open-ended problem with underspecified objectives that allow different analytics and leverage a wide variety of heterogeneous data sources. The data scientist then investigates hypotheses, integrates the necessary data, runs different analytics, and looks for patterns of interest or models requiring several iterations of model building, evaluation, additional data, rebuilding, and so on. However, the commercial or real-world value obtained by these investigations is unknown in advance, leading to limited or deferred investment for optimal infrastructure that often results in redundancy of manual efforts and computation. Building complex AI systems requires extensive programming skills and the ability to work with various reasoning and learning paradigms and techniques at a low level of abstraction. The result is an AI or ML product development process that is slow, hindered by manual processes, complex and difficult to learn tools, and platforms that lack scalability, interoperability, and governance.

AI and ML applications are data-hungry processes. They require new expertise and new capabilities, especially data science, and a means of operationalizing the work to build AI and ML models. In many organizations, enterprise AI and ML development efforts have evolved as a series of one-off projects and are often siloed in one area of the company or even as a skunkworks effort. Alternatively, organizations may procure custom AI solutions and implementations from specialized software developers. In both scenarios, the scientists, engineers, and analysts creating AI applications use an amalgamation of software libraries, tools, point solutions, distributed systems, as well as AI and IT infrastructures, generally assembled piecemeal to craft a complete solution for the product development lifecycle. The assembly, installation, and management of such applications is challenging and usually is performed either manually or by writing customized scripts. Thus, integrating different heterogeneous technologies increases the overall complexity of implementing such applications. In addition, script-centric technologies often depend on the underlying infrastructure such as operating systems, leading to problems with provisioning logic across different networks and computing infrastructures and portability of applications. Often missing is the project control that comes from a single, integrated view of enterprise-wide AI development. The diversity of tools and specialized algorithms spanning multiple technological specialties results in a lack of broad systems support and optimization methods across the lifecycle.

In a conventional ML project, teams of data scientists and ML engineers work to build state-of-the-art models using manually driven processes. The ML model lifecycle is different and more complex than traditional software development. The ML model lifecycle requires extensive work with data extraction, preparation and verification, infrastructure configuration, provisioning, post-production monitoring, and enhancements. The process of building a high-quality ML model or algorithm is iterative, complex, and time-consuming.

ML algorithms execute as "pipelines" that ingest data (e.g., via batch data lakes, stream brokers, etc.) and performs computational tasks (e.g., feature engineering, model training, scoring, inference, etc.). Pipelines may run on engines (e.g., Spark, Flink, etc.) or as standalone programs. A ML manual pipeline process is a convenient and frequently used tool in the study of use cases. The process is script-driven, and every step is manual, including data analysis, data preparation, data transformation, model training, and data validation. Scripts or notebooks that implement the steps of the experiment are controlled sources and produce artefacts such as trained models, evaluation metrics, and visualizations. The data-scientist driven process selection depends on how ML models are changed or trained over time and their complexities. A data scientist is commonly challenged with many choices where informed decisions need to be taken. For example, the data scientist needs to select among a wide range of possible algorithms including classification or regression techniques (e.g., Support Vector Machines, Neural Networks, Bayesian Models, Decision Trees, etc.) and the tuning of numerous hyper-parameters of the selected algorithm. This method may likely produce unexpected results due to various constraints, dependency on data collection, preparation-preprocessing, model training, validation, and testing. In addition, the development-test environment is different from the staging-production environment and ML manual process models often fail to adapt to rapidly evolving user requirements, changes in the dynamics of production environment or changes in the data describing the production environment. Thus, efficient pipelines and infrastructures are required for data-streaming (i.e., data acquisition, data storage, preprocessing and feature extraction, and ingestion by the ML models). Model building and deployment have different constraints regarding the type of problem, data, and the target environments. The result is a manual pipeline method that is not adapted for dynamic changes of the model. Therefore, it produces high operational costs and delays that directly or indirectly affect quality and product commercial potential.

Although making such decisions requires solid knowledge and expertise, in practice, increasingly, users of ML tools are often non-experts who require off-the-shelf solutions. Therefore, there is interest to automate and democratize the steps of building the ML pipelines and tools and frameworks that have been introduced to ease the data scientist work and automate the ML production. However, in practice, there is still a need to integrate these different systems along the whole pipeline. Integrating externally generated code is a challenging task. The existing tools or framework generally have tight coupling of components, a lack of well-defined interfaces and component boundaries, which severely constrain re-usability. Current tools and frameworks are closed and not amenable to customization and are not generally considered to be user friendly. These challenges limit their usability and deployment and inhibit wide acceptance among domain experts as well as layman users who commonly have limited technical skills. These factors are obstacles to the operationalization of AI applications and are at odds with the business needs to rapidly deploy models, generally taking weeks or even months, and the continuous evaluation of quality in production.

The development, deployment, and post-production maintenance of enterprise AI/ML products requires the continual participations of the Data Engineer, expert Data Scientist, and an Operation Team. Specifically, the Data Engineer needs to craft data ingestion and output, potentially to provide data structural transformations and feature engineering/generation, cleanse and encode data, create, and tune models. The Data Engineer and Data Scientist work together to export the transformation logic and models to a solution artefact (e.g., datasets, models, feature sets, predictions, code, etc.). The code on a functioning system is then deployed by the Operation Team. The participation of this multi-steps, multi-functional group, generally non-standardized, is laborious, time intensive, prone to error, and challenging to manage. The process is a very complex task, performed in an iterative manner with trial and error. Consequently, building good ML pipelines is a long and expensive endeavor and practitioners often use a suboptimal default ML pipeline. In addition, the steps across various pipelines interact in complex ways, and their compound effects might be hard to predict or debug, necessitating the management of provenance across them. These additional factors can lead to delays in construction, deployment, and maintenance which becomes increasingly difficult for a Data Science team. Maintenance events can be few and far between and may require the conscription of original team members who may be otherwise be engaged or their expertise is no longer available, leading to challenges in reproducibility.

The need exists, therefore, for a data science workflow framework that incorporates tools and methods for the seamless and user-friendly construction of AI and/or ML pipelines that removes integration barriers and lessens required expertise for the development and deployment of AI products. Since end users of enterprise applications are normally not ML experts, there is a need for a suitable easy-to-use AI production and deployment platform. The goal is to build complete pipelines with every single component optimized automatically; induction of models from data, including the data preprocessing, the choice of a model class, the training and evaluation of a predictor, the transparent representation, interpretation, and reproducibility of results. Thus, the production of AI products may benefit from pre-existing tools and standardized methods that can automate and accelerate, reduce time to value, the creation and deployment process, enabling non-experts to build enterprise AI solutions.

SUMMARY

The following presents a simplified summary of some embodiments of the invention to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for a data science workflow framework that incorporates tools and methods for the seamless and user-friendly construction of AI and/or ML pipelines and is configured to: remove or reduce integration barriers; reduce required expertise for the development and deployment of AI products framework; simplify/streamline integration of raw and heterogeneous data; enable high-level and intuitive abstractions that specify pipeline construction requirements; enable an intuitive and/or automated means, such as a graphical user interface (GUI), for a user to specify ML model standards and customize/configure components, data pipelines, data processing, data transport mechanisms, streaming analytics, AI model libraries, pipeline execution methods, orchestration, adapters, and computing resources. Certain aspects of the present disclosure provide for a data science workflow framework that enables the establishment of a complete end-to-end, transparent, AI solutions building system and process for the development, production, and deployment of reproducible, scalable, and interoperable AI or ML models with governance. Certain aspects to the present disclosure provide for a Packaged AI, an AI multi-wizard for data preparation, processing, data simulation, synthetic data generation, training, and evaluation, and means for packaging and transmission of the Packaged AI for execution on a distributed cloud computing system. The Packaged AI enables the acceleration of the creation and deployment of AI products, preferably by non-data science specialists, in an enterprise infrastructure.

An object of the present disclosure is an artificial intelligence (AI) operating system (OS) for managing the full AI and/or ML application development lifecycle, from product creation through deployment and operation, that separates code from configuration. The OS is capable of simplifying and unifying AI and/or ML applications development for the enterprise. In various embodiments, the OS is an integrated environment comprising one or more software components each pre-loaded with an AI OS intelligent functionality. A component, containing a built and tested code block, provides a mechanism to encapsulate one or more operations (e.g., data handling, computation, etc.) of a ML product lifecycle. The OS comprises a library of reusable or customizable components. In various embodiments, the components may be linked in a sequential, parallel, or complex topology to enable user-friendly data science experimentation, exploration, analytic model execution, data simulation, synthetic data generation, prototyping, pipeline construction, or the like, using streaming or batch data sources. In various embodiments, the components can communicate with other components, manage, and connect processes, to establish a complete end-to-end, transparent, AI pipeline building process for the development, production, and deployment of reproducible, scalable, and interoperable ML models and AI applications with governance.

An object of the present disclosure is an artificial intelligence (AI) operating system (OS) comprising, among others, a comprehensive software development kit (SDK) for the management of the full AI and/or ML application development lifecycle. The SDK provides one or more non-limiting capabilities, including data manipulation, data processing, data simulation, synthetic data generation, AI model creation and training, experimentation, resource provisioning, resource management, and deployment. In various embodiments, the SDK facilitates technology (e.g., Python, Java, C++, etc.) interoperability, versioning of code and data, tracking, component programming, code annotation, pipeline construction, model execution, workflow configuration, or the like. In various embodiments, the SDK enables smooth bidirectional transitions from visual representation (e.g., a block, dataflow connection, etc.) or manipulation to code or machine computing instructions. In various embodiments, the SDK provides a command line interface (CLI), user-friendly, and quick access computing environment. In various embodiments, the SDK facilitates access to one or more software components of the OS, including but not limited to a block, a pipeline, or executing engine for the creation, execution, monitoring, and management of said components. An OS in accordance with certain aspects of the present disclosure may enable streamlined exploration, experimentation, production, and evolution of an AI software development lifecycle.

An object of the present disclosure is an OS comprising one or more software component comprising a block. In various embodiments, a block may comprise at least one computing instruction or code that enables a user to define one or more computing tasks. In various embodiments, the task may include, but is not limited to, a function, an instance, a class, or the like. In accordance with certain aspects of the present disclosure, a function, instance, or class may comprise objects that may be configured declaratively using one or more object programming language. The function, instance, or class may comprise objects that may be configured declaratively by chaining together functions with defined input and output objects without the requirement for explicit execution description by a user. In accordance with certain exemplary embodiments, the function, instance, or class may comprise Python objects that may be configured declaratively, by chaining together functions with defined input and output objects, without explicit execution description by a user. In accordance with various exemplary embodiments, one or more block instances may comprise Python class objects containing one or more function, instance, or class annotation decorators. In accordance with various exemplary embodiments, a decorator may enable one or more computing code to be evaluated at one or more function definition or function invocation. In accordance with various exemplary embodiments, the OS enables a user to declaratively specify one or more tasks within a block including, but not limited to: data transport mechanism between two blocks, computing infrastructure, local or distributed computing resources, execution mode, internal or external AI or ML libraries, standard block library, deployment technology (e.g., container, etc.), or combinations thereof and the like. In accordance with various exemplary embodiments, a block may be configured with one or more task to enable the monitoring of real time computing machine code, machine instruction execution, resource utilization (e.g., CPU usage) and model performance metrics (e.g., accuracy, precision, recall, etc.). In accordance with various exemplary embodiments, one or more blocks are connected to form an AI or ML pipeline or complex scientific, engineering, or business analytical, scalable workflow.

An object of the present disclosure is an OS comprising one or more software component comprising a pipeline. In accordance with certain aspects of the present disclosure, a pipeline may comprise one or more blocks, as described above and may enable a user to perform data science experimentation, exploration, or analysis by arranging and connecting blocks containing defined functions, instance, or objects, to create an end-to-end AI or ML model lifecycle process. In accordance with various aspects of the present disclosure, the lifecycle process may include, but is not limited to, raw data collection, batch and streaming, data engineering, model training, model validation, experiment tracking, data provenance, model deployment, model monitoring or combinations thereof and the like. In accordance with certain exemplary embodiments, an AI or ML model lifecycle process may be annotated by a decorator for execution by a local or distributed computing system. In accordance with certain exemplary embodiments, a pipeline may automatically generate one or more representational state transfer (REST) endpoints through one or more service block. In various embodiments, one or more endpoints may include gRPC, Folder Polling, Message Queue (e.g., KAFKA, ACTIVEMQ, RABBITMQ) MPI, graph query language, Socket Connection, SOAP, and the like. In a preferred embodiment, a pipeline may enable live mode, continuous operation, synchronous or asynchronous streaming and integration with one or more external applications ("Apps"). An object of the present disclosure is an OS comprising one or more software component comprising an engine. In accordance with various aspects of the present disclosure, an engine may enable the execution of one or more pipeline via a local or distributed computing environment at scale (i.e., using large models and data sets). In accordance with various aspects of the present disclosure, the OS may provide one or more application programming interface (API). In accordance with certain exemplary embodiments, an API may be constructed, configured, or incorporated in code developed using an electronic notebook or computing environment; for example, such as those provided by JUPYTER NOTEBOOK or GOOGLE COLAB. In accordance with various aspects of the present disclosure, an engine may enable the orchestration of tasks and pipelines, allocate resources, manage multiple data source interactions, provision, and terminate resources, manage failovers and restarts, manage messaging, and provide logging and monitoring services. An OS as provided by the present disclosure may provide a metric server and a model lifecycle manager via one or more engine.

An object of the present disclosure is an executor engine for constructing and/orchestrating the execution of a pipeline. In accordance with certain aspects of the present disclosure, an executor engine may comprise a module for controlling block and pipeline tasks, functions, and processes. In accordance with certain exemplary embodiments, an execution engine may coordinate pipeline elements, processes, and functions by configuring specifications; allocating elastic provisioning-deprovisioning execution of resources and the control of task transports to local and external resources; enabling a block or pipeline script to be transported to and from computing resources; and accessing and retrieving resources via one or more API. In accordance with certain exemplary embodiments, task execution may be conducted on one or more target resources including, but not limited to, one or more cloud/remote server, multi-core workstations, distributed computing systems, supercomputers, or combinations thereof and the like. In accordance with certain exemplary embodiments, an executor engine may enable user-defined scaling or configuration for pipeline execution. A configuration may comprise the specifications of an external computing system, connection channel, communication protocol, technology binding, memory allocation, queues, computing duration, and data transport/management options. In accordance with certain exemplary embodiments, an executor engine may automatically configure and execute tasks based on derived heuristics, meta-heuristics and one or more historical test cases tuned to common execution patterns, to determine an optimal resource allocation strategy for a user-defined ML pipeline. In accordance with various embodiments, an execution engine may construct and orchestrate execution using a task or task dependency graph comprising all the states for a pipeline program mapped to available execution resources. In certain exemplary embodiments, a task graph is represented as a directed acyclic graph (DAG), preferably a dynamic task graph. In certain exemplary embodiments, an execution engine may perform a variety of functions including, but not limited to, tracking information in a data structure, deriving and resolving dependencies, storing-receiving metadata and/or future data or results from asynchronous operations or call backs, performing fault-tolerant, processing exceptions and execution errors, and combinations thereof and/or the like. In certain exemplary embodiments, an execution engine control logic may be derived from one or more annotated decorators of one or more blocks enabling asynchronous, parallel, and portable execution of heterogenous pipeline workloads independent of resource allocations or constraints.

An object of the present disclosure is a pipeline intelligence process for transporting data between blocks and adapters for data transformation. In accordance with certain aspects of the present disclosure, a pipeline intelligence process may provide a method for configuring one or more transport mechanisms or connection technologies (e.g., APACHE KAFKA, ZEROMQ etc.) for various data and data sources. In accordance with certain aspects of the present disclosure, one or more user configurable transport mechanism may enable the transfer of streaming data, files, or data memory between two blocks arranged within a pipeline. In accordance with certain embodiments, a transport mechanism may provide access to live data sources including, but not limited to, real-time chat, streaming video, and combinations thereof or the like. In accordance with certain exemplary embodiments, an adapter may enable conversion of one or more data set, data frame, and/or data serialization protocol to satisfy the input requirements of a block arranged within a pipeline. In accordance with certain exemplary embodiments, the output of a block may be adapted or modified as batch-by-batch or atomic, contiguous streaming dataset. In accordance with various embodiments, the pipeline intelligence process may enable one or more service block to interact with an external resource or application in real-time, via streaming data, to receive and process one or more service requests.

An object of the present disclosure is a general-purpose computer system configured to execute or otherwise embody various aspects of the said artificial intelligence (AI) operating system (OS) for managing the full lifecycle of AI and/or ML application development, from product creation through deployment and operation. The computer system in accordance with the present disclosure may comprise systems and/or sub-systems, including at least one microprocessor, memory unit (e.g., ROM), removable storage device (e.g., RAM), fix/removable storage device(s), input-output (I/O) device, network interface, display, and keyboard. In various embodiments, the general-purpose computing system may serve as a client enabling user access to the OS system and methods, locally or as a client, of a distributed computing platform or backend server. In accordance with various embodiments, one or more code, script, or declaration may be executed locally or remotely. In various embodiments, the OS may provide user-access to a free standing CLI. In accordance with various embodiments, the CLI allows users to specify, declare, and run tasks, execute pipelines locally, sync data and code, sync run and result output, track local experiments, publish a block or pipeline into a database, or the like. In various embodiments, the CLI enables a secured connection to a cloud platform to execute one or more tasks using a secure shell ("SSH") network protocol. In accordance with various embodiments, the OS may provide a GUI to create a pipeline by dragging and dropping blocks onto a canvas and connecting them to rapidly create pipelines, manage executors, transport mechanisms, and adaptors. In accordance with various embodiments, the computing system of the present disclosure may execute instructions encapsulated within a block including, but not limited to, annotated decorator function, instance, class, or object. In accordance with certain aspects of the present disclosure, the instructions encapsulated within the block may be configured to enable sequential, parallel, synchronous, asynchronous, or concurrent completion of one or more said tasks of an end-to-end AI solution, application, ML model development, deployment, product lifecycle, combinations thereof, and the like.

Certain aspects of the present disclosure provide for a computer system, comprising at least one computer processor configured to execute computer program instructions; and a non-transitory computer-readable memory device communicably engaged with the at least one computer processor and having computer program instructions stored thereon that, when executed, cause the at least one computer processor to perform operations comprising storing at least one software component comprising a block, the block comprising at least one function for encapsulating at least one computing task as an object within an object-oriented programming framework; receiving a user-generated input comprising at least one declarative specification for one or more operations of a data processing pipeline or workflow; processing the user-generated input according to at least one artificial intelligence framework to identify one or more computing tasks associated with the one or more operations; configuring one or more blocks to encapsulate the one or more computing tasks as objects within the one or more blocks; and configuring one or more functional relationships between the one or more blocks according to the at least one declarative specification, wherein the one or more functional relationships comprise at least one data transport function between the one or more blocks, wherein the one or more blocks, when configured according to the at least one declarative specification, comprise a topology of the data processing pipeline or workflow.

In accordance with certain exemplary embodiments of the computer system of the present disclosure, the operations of the at least one computer processor may further comprise algorithmically configuring at least one software component comprising a pipeline according to the at least one declarative specification, the pipeline comprising at least one data transport mechanism for each block in the one or more blocks. In certain embodiments, the operations of the at least one computer processor may further comprise algorithmically configuring at least one software component comprising an engine according to the at least one declarative specification, the engine comprising one or more functions configured to execute the one or more computing tasks of the one or more blocks and provision one or more computing resource for the data processing pipeline or workflow. In certain embodiments, the operations of the at least one computer processor may further comprise rendering a graphical user interface configured to enable a user to configure one or more input-output functions for the one or more blocks by configuring one or more graphical connectors between each block in the one or more blocks. In certain embodiments, the block may comprise at least one function configured as a decorator within the object-oriented programming framework, wherein the at least one function comprises a function associated with the one or more functional relationships. In certain embodiments, the operations of the at least one computer processor may further comprise storing at least one software component comprising an adaptor, the adaptor comprising at least one function for modifying a data input format or a data output format for the block. In certain embodiments, the data processing pipeline or workflow comprises a machine learning pipeline. In certain embodiments, the operations of the at least one computer processor may further comprise storing at least one software component comprising a service block, the service block comprising at least one function for synchronous or asynchronous data transfer with one or more external application. In certain embodiments, the pipeline may be configured to algorithmically generate one or more endpoint for the service block, wherein the one or more endpoint is configured to enable at least one application programming interface between the service block and the one or more external application.

Further aspects of the present disclosure provide for a computer-implemented method, comprising storing, with at least one non-transitory computer-readable memory device, at least one software component comprising a block, the block comprising at least one function for encapsulating at least one computing task as an object within an object-oriented programming framework; receiving, with at least one computer processor, a user-generated input comprising at least one declarative specification for one or more operations of a data processing pipeline or workflow; processing, with the at least one computer processor, the user-generated input according to at least one artificial intelligence framework to identify one or more computing tasks associated with the one or more operations; configuring, with the at least one computer processor, one or more blocks to encapsulate the one or more computing tasks as objects within the one or more blocks; and configuring, with the at least one computer processor, one or more functional relationships between the one or more blocks according to the at least one declarative specification, wherein the one or more functional relationships comprise at least one data transport function between the one or more blocks, wherein the one or more blocks, when configured according to the at least one declarative specification, comprise a topology of the data processing pipeline or workflow.

In accordance with certain exemplary embodiments, the method may further comprise storing, with the at least one non-transitory computer-readable memory device, at least one software component comprising a pipeline, the pipeline comprising at least one data transport mechanism for each block in the one or more blocks. In certain embodiments, the method may further comprise storing, with the at least one non-transitory computer-readable memory device, at least one software component comprising an engine, the engine comprising one or more functions configured to execute the one or more computing tasks of the one or more blocks and provision one or more computing resource for the data processing pipeline or workflow. In certain embodiments, the method may further comprise rendering, with the at least one computer processor, a graphical user interface configured to enable a user to configure one or more input-output functions for the one or more blocks by configuring one or more graphical connectors between each block in the one or more blocks. In certain embodiments, the method may further comprise storing, with the at least one non-transitory computer-readable memory device, at least one software component comprising an adaptor, the adaptor comprising at least one function for modifying a data input format or a data output format for the block. In certain embodiments, the method may further comprise storing, with the at least one non-transitory computer-readable memory device, at least one software component comprising a service block, the service block comprising at least one function for synchronous or asynchronous data transfer with one or more external application. In certain embodiments, the method may further comprise further comprising rendering, with the at least one processor, a graphical user interface configured to present a graphical representation of the topology of the data processing pipeline or workflow, wherein the graphical representation comprises one or more graphical elements indicative of the one or more functional relationships between the one or more blocks. In certain embodiments, the method may further comprise configuring, with the at least one processor, the topology of the data processing pipeline or workflow according to a graphical arrangement of the one or more graphical elements within the graphical user interface, wherein the graphical arrangement is configured by a user. In certain embodiments, the method may further comprise algorithmically configuring, with the at least one processor, at least one computing resource estimation for each block in the one or more blocks. In certain embodiments, the method may further comprise dynamically configuring, with the at least one processor according to the at least one artificial intelligence framework, at least one computing resource allocation for each block in the one or more blocks.

Still further aspects of the present disclosure provide for a non-transitory computer-readable medium storing executable computer program instructions, the instructions executable to command at least one processor to perform operations comprising storing at least one software component comprising a block, the block comprising at least one function for encapsulating at least one computing task as an object within an object-oriented programming framework; receiving a user-generated input comprising at least one declarative specification for one or more operations of a data processing pipeline or workflow; processing the user-generated input according to at least one artificial intelligence framework to identify one or more computing tasks associated with the one or more operations; configuring one or more blocks to encapsulate the one or more computing tasks as objects within the one or more blocks; and configuring one or more functional relationships between the one or more blocks according to the at least one declarative specification, wherein the one or more functional relationships comprise at least one data transport function between the one or more blocks, wherein the one or more blocks, when configured according to the at least one declarative specification, comprise a topology of the data processing pipeline or workflow.

In continuation, accordance, and further aspects of the present disclosure is a method and system (hereinafter an "Packaged AI") comprising one or more pre-configured tools (e.g., blocks, pipeline, engine, etc.) and standardized methods for automating and accelerating the creation, assembling, production, and deployment of AI products. The Packaged AI comprises one or more components, templates, crafted user interface (UI) components, streaming input-output (TO) to pipelines, thin engine, and thin application (hereinafter "Quick App") for the production and deployment of AI products including at least one Packaged AI. In various embodiments, Packaged AI components comprise means for file upload, model training, data (e.g., text, image, structured, unstructured, etc.) handling, combinations thereof, or the like. In various embodiments, a template comprises an automated ML framework for data import, data preparation, data transformation, feature generation, data simulation, synthetic data generation, algorithms selection, hyperparameters tuning, models training, evaluation, interpretation, and deployment. In various embodiments, the said IO comprises one or more transmissible AI build/products containing one or more pipelines and/or ML models for executing one or more AI solutions produced by the Packaged AI. In a preferred embodiment, the downloadable AI comprises a thin or mini version of an AI engine stored and deployed via containerization technology. In various embodiments, the downloadable AI comprises one or more Quick Apps to enable rapid testing and deployment of said AI products. In various embodiments, the transmissible AI product utilizes containerization, a lightweight virtualization technology for deployment and execution on one or more distributed cloud computing platforms. In various embodiments, a Packaged AI incorporates one or more said block, pipeline, engine, architecture, and AI OS of the present disclosure. The system enables full serialization and versioning of all entities relating to an AI build/product for deployment within an enterprise architecture.

Certain further aspects of the present disclosure provide for a computer system, comprising at least one computer processor configured to execute computer program instructions; and a non-transitory computer-readable memory device communicably engaged with the at least one computer processor and having computer program instructions stored thereon that, when executed, cause the at least one computer processor to perform operations comprising providing a graphical user interface within an end-user application to an end user, the graphical user interface comprising one or more interface elements for selecting a template for at least one pre-configured machine learning framework, wherein the template for the at least one pre-configured machine learning framework comprises one or more computing tasks encapsulated as one or more objects within one or more blocks within an object-oriented programing framework, the one or more blocks comprising a topology of a data processing pipeline or workflow for the at least one pre-configured machine learning framework; providing, in response to a first user-generated input, the template for the at least one pre-configured machine learning framework, wherein the template comprises one or more interface elements for configuring the at least one pre-configured machine learning framework; processing, in response to a second user-generated input, a training dataset for the at least one pre-configured machine learning framework; providing, to the end user via the graphical user interface, one or more data visualizations for the training dataset and one or more interface elements for preparing one or more data elements for the training dataset; training, in response to a third user-generated input, at least one machine learning pipeline according to the training dataset; providing, to the end user via the graphical user interface, one or more interface elements for evaluating the at least one machine learning pipeline; and storing the at least one machine learning pipeline in at least one software component comprising a container.

In accordance with certain embodiments of said computer system, the operations may further comprise exporting the container comprising the at least one machine learning pipeline to at least one cloud computing environment. In certain embodiments, the at least one cloud computing environment comprises a serving core for the at least one machine learning pipeline. In certain embodiments, the one or more interface elements for preparing the one or more data elements for the training dataset comprise one or more interface elements for configuring the one or more data elements according to at least one use-case for the at least one machine learning pipeline. In certain embodiments, the one or more interface elements for preparing the one or more data elements for the training dataset comprise one or more interface elements for configuring a data processing pipeline for the at least one machine learning pipeline. In certain embodiments, the operations further comprise providing, to the end user via the graphical user interface, one or more interface elements for configuring one or more training metrics for the at least one machine learning pipeline according to at least one use-case. In certain embodiments, the one or more interface elements for evaluating the at least one machine learning pipeline comprise one or more interface elements for uploading an evaluation dataset. In certain embodiments, the operations further comprise processing the evaluation dataset according to the at least one machine learning pipeline. In certain embodiments, the one or more interface elements for evaluating the at least one machine learning pipeline comprise one or more interface elements for evaluating one or more model outputs of the least one machine learning pipeline according to at least one use-case. In certain embodiments, the container comprises at least one container image.

Certain further aspects of the present disclosure provide for a computer-implemented method, comprising providing, with at least one computer processor, a graphical user interface within an end-user application to an end user, the graphical user interface comprising one or more interface elements for selecting a template for at least one pre-configured machine learning framework, wherein the template for the at least one pre-configured machine learning framework comprises one or more computing tasks encapsulated as one or more objects within one or more blocks within an object-oriented programing framework, the one or more blocks comprising a topology of a data processing pipeline or workflow for the at least one pre-configured machine learning framework; providing, with the at least one computer processor in response to a first user-generated input, the template for the at least one pre-configured machine learning framework, wherein the template comprises one or more interface elements for configuring the at least one pre-configured machine learning framework; processing, with the at least one computer processor in response to a second user-generated input, a training dataset for the at least one pre-configured machine learning framework; providing, with the at least one computer processor, one or more data visualizations for the training dataset and one or more interface elements for preparing one or more data elements for the training dataset to the end user via the graphical user interface; training, with the at least one computer processor in response to a third user-generated input, at least one machine learning pipeline according to the training dataset; providing, with the at least one computer processor, one or more interface elements for evaluating the at least one machine learning pipeline to the end user via the graphical user interface; and storing, with the at least one computer processor communicably engaged with at least one non-transitory computer readable medium, the at least one machine learning pipeline in at least one software component comprising a container.

In accordance with certain aspects of the present disclosure, said computer-implemented method may further comprise one or more steps or operations for exporting, with the at least one computer processor, the container comprising the at least one machine learning pipeline to at least one cloud computing environment. In certain embodiments, the at least one cloud computing environment comprises a serving core for the at least one machine learning pipeline. In certain embodiments, the one or more interface elements for preparing the one or more data elements for the training dataset comprise one or more interface elements for configuring the one or more data elements according to at least one use-case for the at least one machine learning pipeline. In certain embodiments, the one or more interface elements for preparing the one or more data elements for the training dataset comprise one or more interface elements for configuring a data processing pipeline for the at least one machine learning pipeline. In accordance with certain aspects of the present disclosure, said computer-implemented method may further comprise one or more steps or operations for providing, with the at least one computer processor, one or more interface elements for configuring one or more training metrics for the at least one machine learning pipeline according to at least one use-case to the end user via the graphical user interface. In certain embodiments, the one or more interface elements for evaluating the at least one machine learning pipeline comprise one or more interface elements for uploading an evaluation dataset. Said computer-implemented method may further comprise one or more steps or operations for processing, with the at least one computer processor, the evaluation dataset according to the at least one machine learning pipeline. In certain embodiments, the one or more interface elements for evaluating the at least one machine learning model comprise one or more interface elements for evaluating one or more model outputs of the least one machine learning pipeline according to at least one use-case.

Certain further aspects of the present disclosure provide for a non-transitory computer-readable medium storing executable computer program instructions, the instructions executable to command at least one processor to perform operations comprising providing a graphical user interface within an end-user application to an end user, the graphical user interface comprising one or more interface elements for selecting a template for at least one pre-configured machine learning framework, wherein the template for the at least one pre-configured machine learning framework comprises one or more computing tasks encapsulated as one or more objects within one or more blocks within an object-oriented programing framework, the one or more blocks comprising a topology of a data processing pipeline or workflow for the at least one pre-configured machine learning framework; providing, in response to a first user-generated input, the template for the at least one pre-configured machine learning framework, wherein the template comprises one or more interface elements for configuring the at least one pre-configured machine learning framework; processing, in response to a second user-generated input, a training dataset for the at least one pre-configured machine learning framework; providing, to the end user via the graphical user interface, one or more data visualizations for the training dataset and one or more interface elements for preparing one or more data elements for the training dataset; training, in response to a third user-generated input, at least one machine learning pipeline according to the training dataset; providing, to the end user via the graphical user interface, one or more interface elements for evaluating the at least one machine learning pipeline; and storing the at least one machine learning pipeline in at least one software component comprising a container.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION

Figure 1:
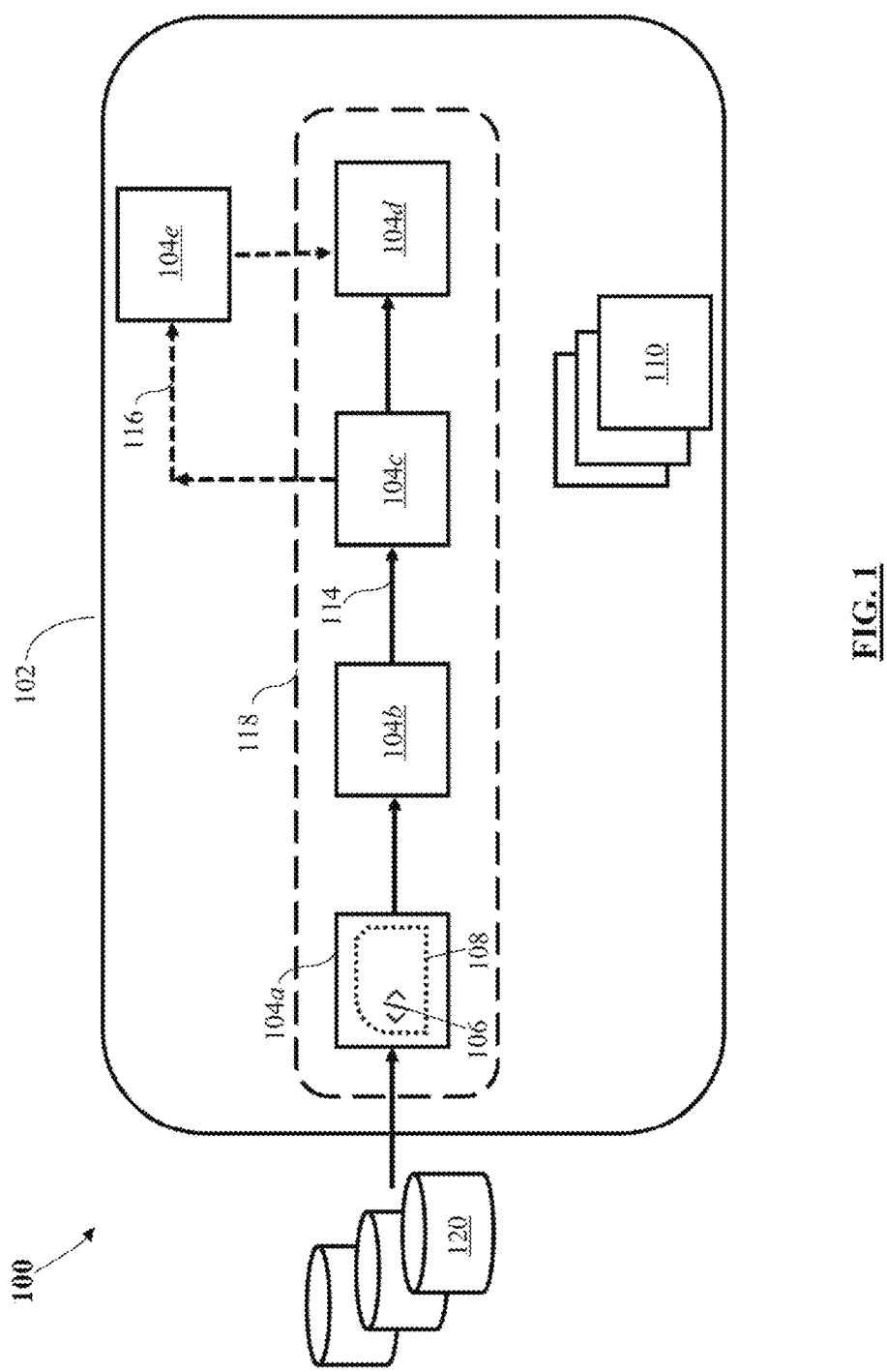
FIG. 1 is a block diagram of an artificial intelligence operating system, in accordance with certain aspects of the present disclosure.

It should be appreciated that all combinations of the concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the concepts disclosed herein.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof.

As used herein, the term "Artificial Intelligence" (AI) system refers to software (and possibly also hardware) systems designed that, given a complex goal, act in the physical or digital dimension by perceiving their environment through data acquisition, interpreting the collected structured or unstructured data, reasoning on the knowledge, or processing the information, derived from this data and deciding the best action(s) to take to achieve the given goal. AI systems can either use symbolic rules or learn a numeric model, and they can also adapt their behavior by analyzing how the environment is affected by their previous actions. AI includes any algorithms, methods, or technologies that make a system act and/or behave like a human and includes machine learning, computer vision, natural language processing, cognitive, robotics, and related topics.

As used herein, the term "Machine Learning" (ML) refers to the application of AI techniques or algorithms using statistical methods that enable computing systems or machines to improve correlations as more data is used in the model, and for models to change over time as new data is correlated. Machine learning algorithms include Neural Networks, Deep Learning, Deterministic model, stochastic model, supervised, unsupervised, Bayesian Networks, Clustering, Decision Tree Learning, Reinforcement Learning, Representation Learning, or the like.

As used herein, the term "Packaged AI" refers an AI product or solution.

As used herein, the term "Packaged AI Template" refers to an automated ML pipeline assembly process for data importation, preparation, feature engineering, training, evaluation, and electronic packaged delivery of an AI product or solution.

As used herein, the term "synthetic data" refers to data generated by computer simulation.

As used herein, the term "instance" refers to a leased bundle of memory and central processing unit (CPU) from an infrastructure-as-service cloud computing platform.

As used herein the term "spot instance" refers to a workload receiving and exclusive access to an instance until a competing workload outbids the lease price.

As used herein, the term "Downloadable AI" refers a package AI product, solution, or application deployed using containerization technology, for example DOCKER. A containerized application refers to an application packed in a container. It could be a monolithic application, or one composed of independent components. In the latter case, each component could be packed in an independent container. As used herein, the term "containerization" refers to a lightweight virtualization technology enabling the deployment and execution of distributed applications on cloud, edge/fog and Internet-of-Things platforms.

Exemplary embodiments of the present disclosure provide for an artificial intelligence (AI) operating system (OS) and data processing methods via a software development kit (SDK) for constructing and managing an end-to-end AI or ML product development lifecycle. In accordance with certain aspects of the present disclosure, the AI OS may be capable of simplifying and unifying AI and/or ML applications development for an enterprise. The AI OS may comprise an integrated environment comprising one or more software components call blocks, each block comprising programming code configured to enable various function and operations within an AI OS intelligent framework. According to certain embodiments, a block may comprise one or more integrated and tested code segments to provide a mechanism to encapsulate one or more operations of a ML product lifecycle; for example, a Python decorator. An SDK may comprise a library of reusable or tools to enable a user to create and configure a variety of customizable blocks within a data processing workflow or pipeline. In accordance with certain exemplary embodiments, the blocks may be linked in a sequential, parallel, or complex topology to form a pipeline for enabling user-friendly data science experimentation, exploration, analytic model execution, prototyping, pipeline construction, and deployment using a GUI. In certain embodiments, blocks may be capable of servicing real-time applications utilizing streaming data with configurable data transport and adapters. The AI OS may comprise an execution engine for constructing and/or orchestrating the execution of a data processing pipeline and enable automatic provisioning of optimal computing resources for each of the functions, tasks or operations for each block. The AI OS may provide a free standing CLI that is accessible by a user to construct pipelines, utilize local and/or distributed computing systems, and execute all capabilities and functions provided by the AI OS for managing the full lifecycle of ML solutions or application development. In accordance with certain embodiments, a general-purpose computer system may execute various operations defined by the AI OS for managing the full lifecycle of AI and/or ML application development (e.g., from product creation through deployment and operation). In accordance with certain embodiments, a Packaged AI system comprising easy to use pre-existing tools (e.g., blocks, pipeline, engine, etc.) and standardized methods, crafted templates, enables automation and accelerating the simple creation, assembling, production, and deployment of AI products. The system comprises one or more components, templates, crafted user interface (UI) components, streaming input-output (IO) to pipelines, thin engine, and thin, containerized, static and dynamic structures, downloadable application for the production and deployment of AI products. The Packaged AI incorporates one or more said block, pipeline, engine, architecture, intelligent container provisioning architecture for on-demand spot instance execution, and AI OS of the present disclosure. The system enables full serialization and versioning of all entities relating to an AI build/product for deployment within an enterprise architecture.

Certain benefits and advantages of the present disclosure is an operating system and platform configured to simplify the process for a data science user to build an AI application and/or MS model solution. The designer of a machine learning (ML) model solution, referred to herein as a "data science user," may utilize one of several programming languages/tools (e.g., C, Python, Java, R, etc.) to articulate their analytic model that may use, among others, libraries/packages such as NUMPY for scientific and numeric computing and/or TENSORFLOW for ML. Machine learning represents the automated extraction of models (or patterns) from data. A ML lifecycle consists of varying number of stages depending on user application and objectives. For edification purposes, an ML lifecycle has four stages. The first three stages of the ML lifecycle comprise (1) Data Management (e.g., extraction, processing, etc.); (2) Model Building/Learning; and (3) Model Verification. The first three stages comprise the activities by which machine-learnt models are produced. These three stages taken together are generally referred to or are termed a ML workflow for pipeline construction. The fourth stage, Pipeline Deployment, comprises the activities concerned with the deployment of ML models and their inferences or predictions within an operational system, alongside components obtained using traditional software and system engineering methods. The solution building process typically involves the following steps:

1. Data Extraction. This is the first step in the process where the user extracts the data needed for building the AI solution. The data can be extracted from various external sources like structured databases, video feeds, image streams, and the like. Examples of typical data sources may include structured data stored in a SQL Store like Oracle database; data stored in a distributed data store like HDFS or S3; video and image streams; and text data from external sources like URLs and RSS feeds.

2. Data Processing. In this step, a data scientist processes the data extracted from different sources to a format which can be used in the modeling process. Once the data is extracted, the data needs to be converted into a form that can be consumed by the model. In the data processing step, multiple steps may be utilized to cleanse the data and bring it to a format which can be fed to the model. Some of the basic steps involved in data processing may include: (1) cleanse the data that is extracted from the data sources are filtered. In this process, certain columns and rows are removed from the dataset based on the requirements of the use case; (2) normalize the data within a range of values using the statistical features of the dataset; and (3) encode the data to a format that can be fed to the model for processing. There are different types of encoding depending on the use case and statistical features of the dataset.

3. Model Building. In this step, the data scientist crafts Deep Learning or Machine Learning models based on the data and the use case that the data scientists are trying to solve. If the model is a deep learning model, the data scientist uses a selection of multiple layers to suit the needs of the use cases. Once the data scientists build a model, the model is optimized through running multiple experiments.

4. Experimentation. In this step, the data scientist runs various experiments to fine tune the solution by varying both the data sets and the parameters of the model(s). Each experiment can be a variation of the model, hyper parameters or the data that is passed to the model itself. Experiments can also tune parameters of the rest of the pipeline parameters e.g., processing logic, and potentially even structure. The data scientist may run multiple experiments and chooses the best model from the experiments. The best model may then be utilized within the AI Solution being built by the data scientist. Data science users focus on algorithm and model design with systems to explore and create algorithms until they have a model conforming to design rules for a model abstraction.

Certain aspects and exemplary embodiments of the present disclosure provide for a computer system, comprising at least one computer processor configured to execute computer program instructions; and a non-transitory computer-readable memory device communicably engaged with the at least one computer processor and having computer program instructions stored thereon that, when executed, cause the at least one computer processor to perform operations comprising storing at least one software component comprising a block, the block comprising at least one function for encapsulating at least one computing task as an object within an object-oriented programming framework; receiving a user-generated input comprising at least one declarative specification for one or more operations of a data processing pipeline or workflow; processing the user-generated input according to at least one artificial intelligence framework to identify one or more computing tasks associated with the one or more operations; configuring one or more blocks to encapsulate the one or more computing tasks as objects within the one or more blocks; and configuring one or more functional relationships between the one or more blocks according to the at least one declarative specification, wherein the one or more functional relationships comprise at least one data transport function between the one or more blocks, wherein the one or more one or more blocks, when configured according to the declarative specification, comprise a topology of the data processing pipeline or workflow.

In accordance with certain embodiments of the computer system, the operations of the processor may further comprise algorithmically configuring at least one software component comprising a pipeline according to the at least one declarative specification, the pipeline comprising at least one data transport mechanism for each block in the one or more blocks. In certain embodiments, the operations of the processor may further comprise algorithmically configuring at least one software component comprising an engine according to the at least one declarative specification, the engine comprising one or more functions configured to execute the one or more computing tasks of the one or more blocks and provision one or more computing resource for the data processing pipeline or workflow. In certain embodiments, the operations of the processor may further comprise rendering a graphical user interface configured to enable a user to configure one or more input-output functions for the one or more blocks by configuring one or more graphical connectors between each block in the one or more blocks. In certain embodiments, the operations of the processor may further comprise storing at least one software component comprising an adaptor, the adaptor comprising at least one function for modifying a data input format or a data output format for the block. In certain embodiments, the operations of the processor may further comprise storing at least one software component comprising a service block, the service block comprising at least one function for synchronous or asynchronous data transfer with one or more external application.

In accordance with certain embodiments of the computer system, the block comprises at least one function configured as a decorator within the object-oriented programming framework, wherein the at least one function comprises a function associated with the one or more functional relationships. In certain embodiments, the at least one data processing pipeline or workflow comprises a machine learning pipeline. In certain embodiments, the pipeline may be configured to algorithmically generate one or more representational state transfer endpoint for the service block, wherein the one or more representational state transfer endpoint is configured to enable at least one application programming interface between the service block and the one or more external application.

Certain further aspects and exemplary embodiments of the present disclosure provide for a computer-implemented method, comprising storing, with at least one non-transitory computer-readable memory device, at least one software component comprising a block, the block comprising at least one function for encapsulating at least one computing task as an object within an object-oriented programming framework; receiving, with at least one computer processor, a user-generated input comprising at least one declarative specification for one or more operations of a data processing pipeline or workflow; processing, with the at least one computer processor, the user-generated input according to at least one artificial intelligence framework to identify one or more computing tasks associated with the one or more operations; configuring, with the at least one computer processor, one or more blocks to encapsulate the one or more computing tasks as objects within in the one or more blocks; and configuring, with the at least one computer processor, one or more functional relationships between the one or more blocks according to the at least one declarative specification, wherein the one or more functional relationships comprise at least one data transport function between the one or more blocks, wherein the one or more blocks, when configured according to the declarative specification, comprise a topology of the data processing pipeline or workflow.

In accordance with certain embodiments of the computer-implemented method, the method may comprise one or more steps for storing, with the at least one non-transitory computer-readable memory device, at least one software component comprising a pipeline, the pipeline comprising at least one data transport mechanism for each block in the one or more blocks. In accordance with certain embodiments, the method may comprise one or more steps for storing, with the at least one non-transitory computer-readable memory device, at least one software component comprising an engine, the engine comprising one or more functions configured to execute the one or more computing tasks of the one or more blocks and provision one or more computing resource for the data processing pipeline or workflow. In accordance with certain embodiments, the method may comprise one or more steps for rendering, with the at least one processor, a graphical user interface configured to enable a user to configure one or more input-output functions for the one or more blocks by configuring one or more graphical connectors between each block in the one or more blocks.

In accordance with certain embodiments, the method may comprise one or more steps for storing, with the at least one non-transitory computer-readable memory device, at least one software component comprising an adaptor, the adaptor comprising at least one function for modifying a data input format or a data output format for the block. In accordance with certain embodiments, the method may comprise one or more steps for storing, with the at least one non-transitory computer-readable memory device, at least one software component comprising a service block, the service block comprising at least one function for synchronous or asynchronous data transfer with one or more external application. In accordance with certain embodiments, the method may comprise one or more steps for rendering, with the at least one processor, a graphical user interface configured to present a graphical representation of the topology of the data processing pipeline or workflow, wherein the graphical representation comprises one or more graphical elements indicative of the one or more functional relationships between the one or more blocks. In accordance with certain embodiments, the method may comprise one or more steps for configuring, with the at least one processor, the topology of the data processing pipeline or workflow according to a graphical arrangement of the one or more graphical elements within the graphical user interface, wherein the graphical arrangement is configured by a user. In accordance with certain embodiments, the method may comprise one or more steps for algorithmically configuring, with the at least one processor, at least one computing resource estimation for each block in the one or more blocks. In accordance with certain embodiments, the method may comprise one or more steps for dynamically configuring, with the at least one processor according to the at least one artificial intelligence framework, at least one computing resource allocation for each block in the one or more blocks.

Still further aspects and exemplary embodiments of the present disclosure provide for a non-transitory computer-readable medium storing executable computer program instructions, the instructions executable to command at least one processor to perform operations comprising storing at least one software component comprising a block, the block comprising at least one function for encapsulating at least one computing task as an object within an object-oriented programming framework; receiving a user-generated input comprising at least one declarative specification for one or more operations of a data processing pipeline or workflow; processing the user-generated input according to at least one artificial intelligence framework to identify one or more computing tasks associated with the one or more operations; configuring one or more blocks to encapsulate the one or more computing tasks as objects within in the one or more blocks; and configuring one or more functional relationships between the one or more blocks according to the at least one declarative specification, wherein the one or more functional relationships comprise at least one data transport function between the one or more blocks, wherein the one or more blocks, when configured according to the declarative specification, comprise a topology of the data processing pipeline or workflow.

Turning now descriptively to the drawings, in which the same reference characters denote the same elements throughout the several views, FIG. 1 depicts a functional block diagram 100 of an artificial intelligence operating system ("AiOS") 102. In accordance with various embodiments, AiOS 102 comprises an integrated environment comprising one or more software component 104 each pre-loaded with an AI OS intelligent functionality. Software component 104 contains a built and tested code block 106 that provides a mechanism 108 to encapsulate one or more operations of a ML product lifecycle. AiOS 102 may comprise a library 110 of reusable or customizable components. In accordance with various embodiments, one or more component 104 may be linked in a sequential connection 114 and/or parallel connection 116 comprising a topology of pipeline 118 for building an analytic ML model. Software component 104 may be configured to accept one or more streaming data sources 120. An analytic model created from pipeline 118 consumes data source 120, typically in the form of a data stream. An analytic data provide may utilize one or more data sources including, for example, APACHE SPARK, HADOOP, AMAZON REDSHIFT, AZURE SQL Data Warehouse, MICROSOFT SQL Server, and/or TERADATA. The analytic data provider or source may utilize one or more example infrastructure systems including: on-premises hardware, such as in-office computing and/or proprietary datacenter computing; or off-premises hardware, such as cloud infrastructure including AMAZON WEB SERVICES, MICROSOFT AZURE, IBM BLUEMIX, and/or GOOGLE Cloud Platform. In accordance with various embodiments, AiOS 102 is configured to enable user-friendly data science experimentation, exploration, analytic model execution, prototyping, pipeline 118 construction, to establish a complete end-to-end, transparent, AI pipeline building process for the development, production, and deployment of reproducible, scalable, and interoperable ML models and AI applications with governance.

Figure 2:
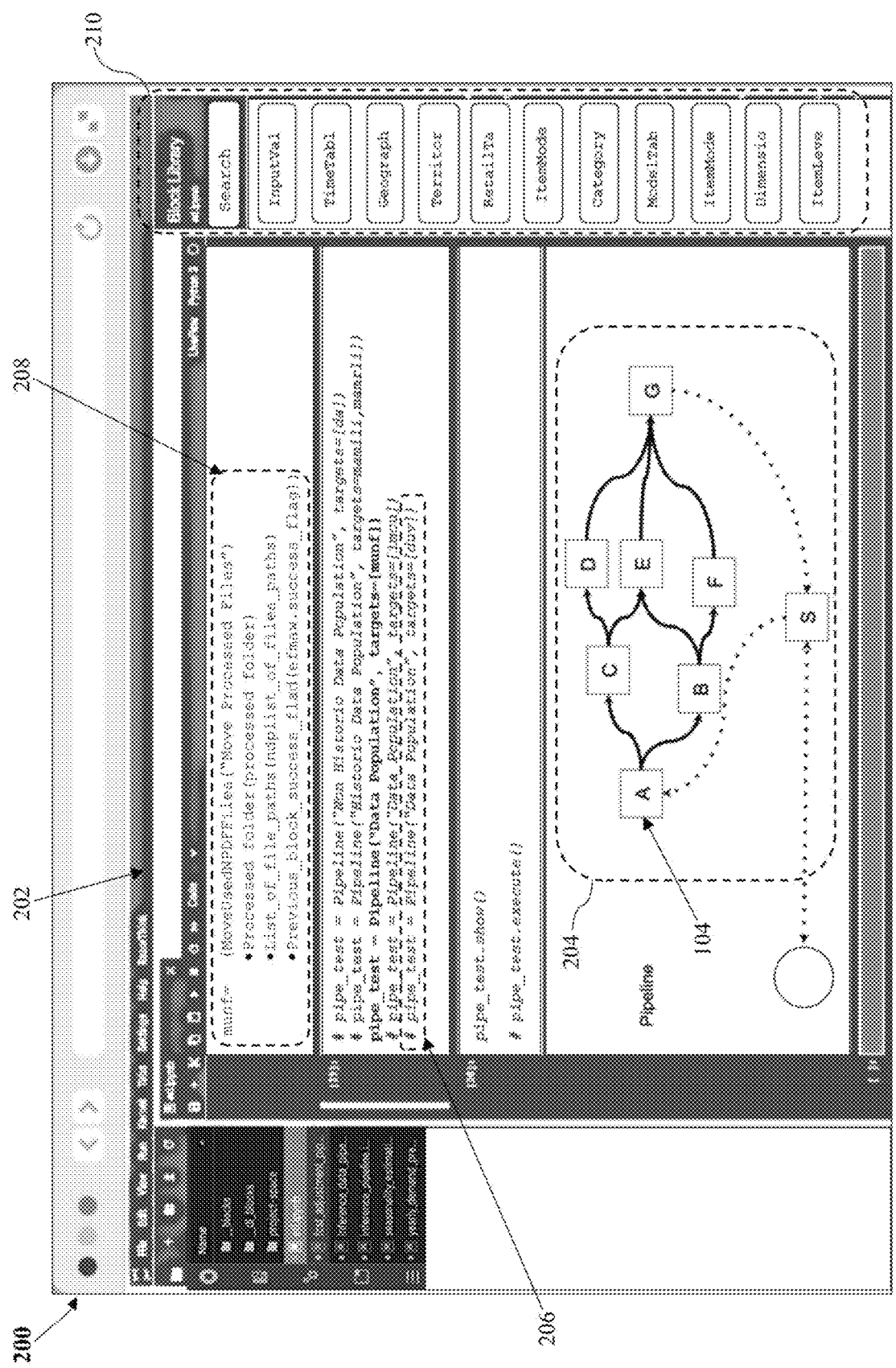
FIG. 2 is a user interface diagram of a software development kit (SDK) for the management of the full AI and/or ML application development lifecycle, in accordance with certain aspects of the present disclosure.

Referring now to FIG. 2, a user interface diagram 200 of a software development kit (SDK) 202 for the management of the full AI and/or ML application development lifecycle is shown. According to various aspects of the present disclosure, SDK 202 provides one or more non-limiting capabilities, including data manipulation, data processing, AI model creation and training, experimentation, provisioning, resource management, and deployment. In accordance with various embodiments, SDK 202 facilitates technology interoperability (e.g., Python, Java, C++, etc.), versioning of code and data, tracking, component programming, code annotation, pipeline construction, model execution, workflow configuration, or the like. In various embodiments, SDK 202 enables smooth bidirectional transitions from visual representation 204 of software component 104 of FIG. 1 or manipulation to code 206. In various embodiments, SDK 202 provides a command line interface (CLI) 210 configured to enable user-friendly and easy access to the computing environment of SDK 202. In various embodiments CLI 210 is an AiOS 102 of FIG. 1 shell enabling a user to provide instructions and data to said operating system, interactively. In various embodiments, SDK 202 facilitates access to one or more software components of the AiOS 102 of FIG. 1, including but not limited to a software component, a block (as described below), a block library 210, a pipeline or engine for the creation, execution, monitoring, and management of said components. In accordance with certain embodiments, AiOS 102 of FIG. 1 enables streamlined exploration, experimentation, production and evolution within an AI software development lifecycle.

An object of the present disclosure is an AiOS comprising one or more software component comprising a "block." AiOS 102 of FIG. 1 introduces the use of a block which provides a mechanism to encapsulate any computing operation within a software component 104 (as shown in FIG. 1). In accordance with various aspects of the present disclosure, blocks are foundational to the design of AiOS 102. Conceptually, blocks are like functions in a programming language. The blocks take in one or more inputs, for example from data source 120 of FIG. 1, perform an operation on the one or more inputs according to one or more integrated or encapsulated functions, and resultingly returns one or more outputs. In accordance with various aspects of the present disclosure, the blocks of an AI OS system and method according to the present disclosure provide the following key features:

1. Ability to use multiple blocks to create complex workflows;
2. Ability to share functionality between multiple users and solutions;
3. Ability to encapsulate complex algorithms and make it available to the users of the platform with ease;
4. Ability to control the data flow by defining specific transport mechanisms (like file, socket, queue, etc.) between blocks; and
5. Ability to easily scale the solution by easily scaling the resources of the blocks. The extensive features provided by the blocks in the AI OS enable a data scientist user to quickly and easily develop and scale artificial intelligence and machine learning solutions according to various needs, use cases and/or applications.

Figure 3:
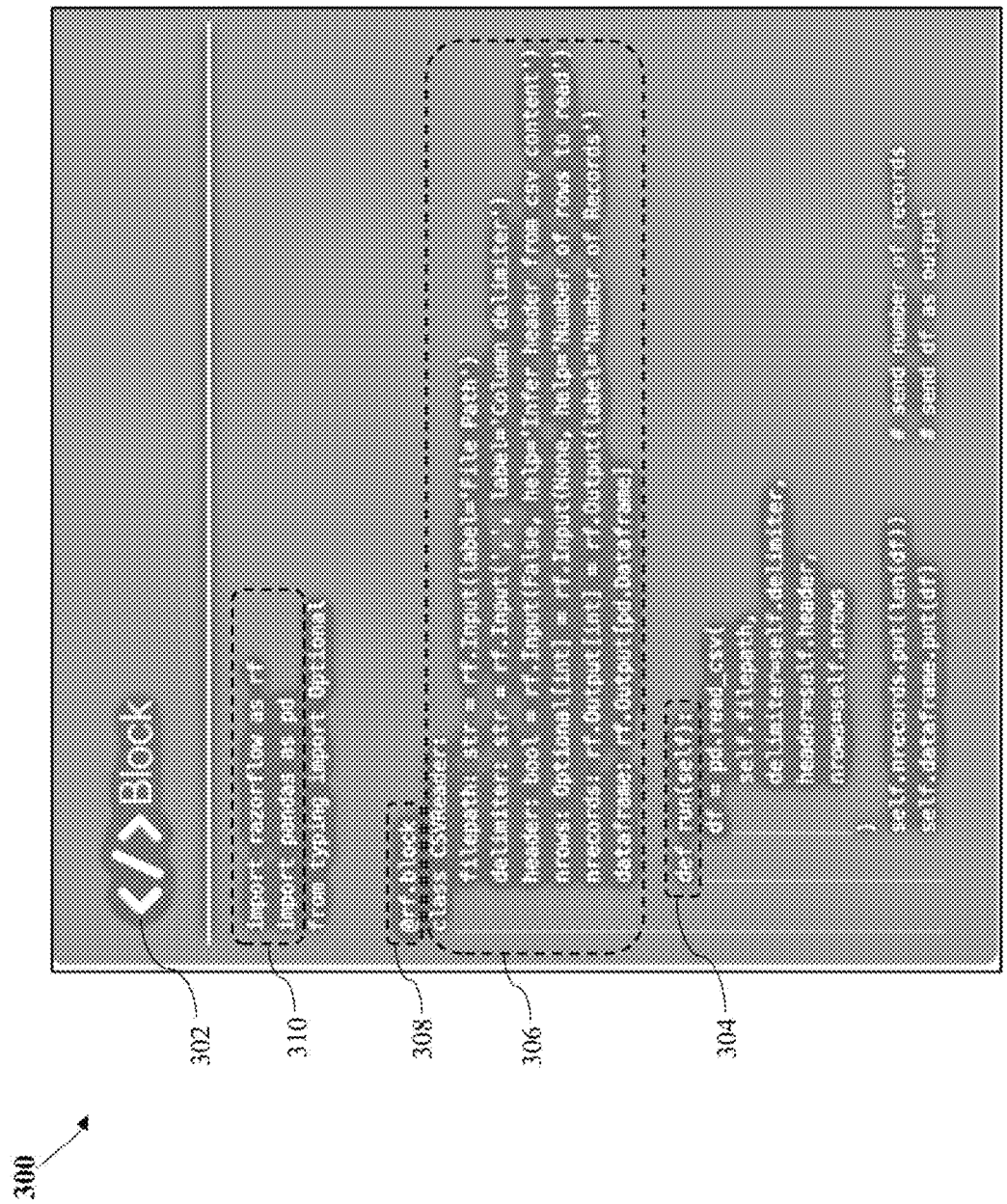
FIG. 3 is a diagram of a command line interface comprising a block code sequence, in accordance with certain aspects of the present disclosure.

Referring now to FIG. 3, a diagram 300 illustrating a code sequence of a block 302 is shown. Block 302 may comprise software component 104 of FIG. 1. According to certain aspects of the present disclosure, block 302 comprises at least one computing instruction 304 or code that enables a user to define one or more computing tasks. In various embodiments, the task includes, but is not limited to a function, an instance, class 306, or the like. In a preferred embodiment, the said function, instance, or class are objects within an object-oriented programming language (e.g., Python) that can be configured declaratively by chaining together functions with defined input and output objects without explicit execution description by a user. In various embodiments, one or more instances of block 304 comprise Python class objects containing one or more function, instance, or class annotation decorator 308. In various embodiments, one or more instances of block 304 comprise class objects of additional object-oriented programming technologies or languages, including PYSPARK, JAVA, JJAVASCRIPT, C++, VISUAL BASIC, .NET, RUBY, SCALA, LISP, MATLAB and the like, containing one or more function, instance, or class annotation decorator 308. In various embodiments, decorator 308 enables one or more computing code to be evaluated at one or more function definition or function invocation. In accordance with certain aspects of the present disclosure, AiOS 102 of FIG. 1 enables a user to declaratively specify one or more tasks within block 302 including, but not limited to, one or more data transport mechanism between two blocks, computing infrastructure, local or distributed computing resources, and execution mode. Block 302 may comprise one or more import function 310 configured to import one or more internal or external AI or ML libraries, standard block library, deployment technology (e.g., container, etc.) within block 302. In various embodiments, block 302 can be configured with one or more task to enable the monitoring of real-time code, instruction execution, resource utilization (e.g., CPU usage), model performance metrics (e.g., accuracy, precision, recall, etc.). In various embodiments, one or more blocks 302 are connected, via code command lines or instructions, to form an AI or ML pipeline, for example, pipeline 118 of FIG. 1, or complex scientific, engineering, or business analytical, scalable workflow.

In accordance with various aspects of the present disclosure, one or more block 302 may comprise the following constructs configured to encapsulate function, instance or class 306 within block 302.

Inputs: The block input is defined using the input class. The block can take two types of inputs:
1. Atomic—A batch of data transmitted between blocks; or
2. Series—The input is a list of values which are streamed to the block.

Outputs: The block output is defined by the output class. The block can send two types of outputs:
1. Atomic—A batch of data is transmitted from the block to the next block; or
2. Series—A series of values are streamed from a block to the next block.

Run Function: The run function performs the operation as defined by the data scientist within the block.

Block 302 may also provide additional functionality configured to control various execution functions within block 302. These functionalities enable a data scientist user to exercise granular controls over the execution of block 302. In accordance with various embodiments, such execution functions may comprise one or more executor, data transport mechanism and/or input-output adapter.

Figure 4:
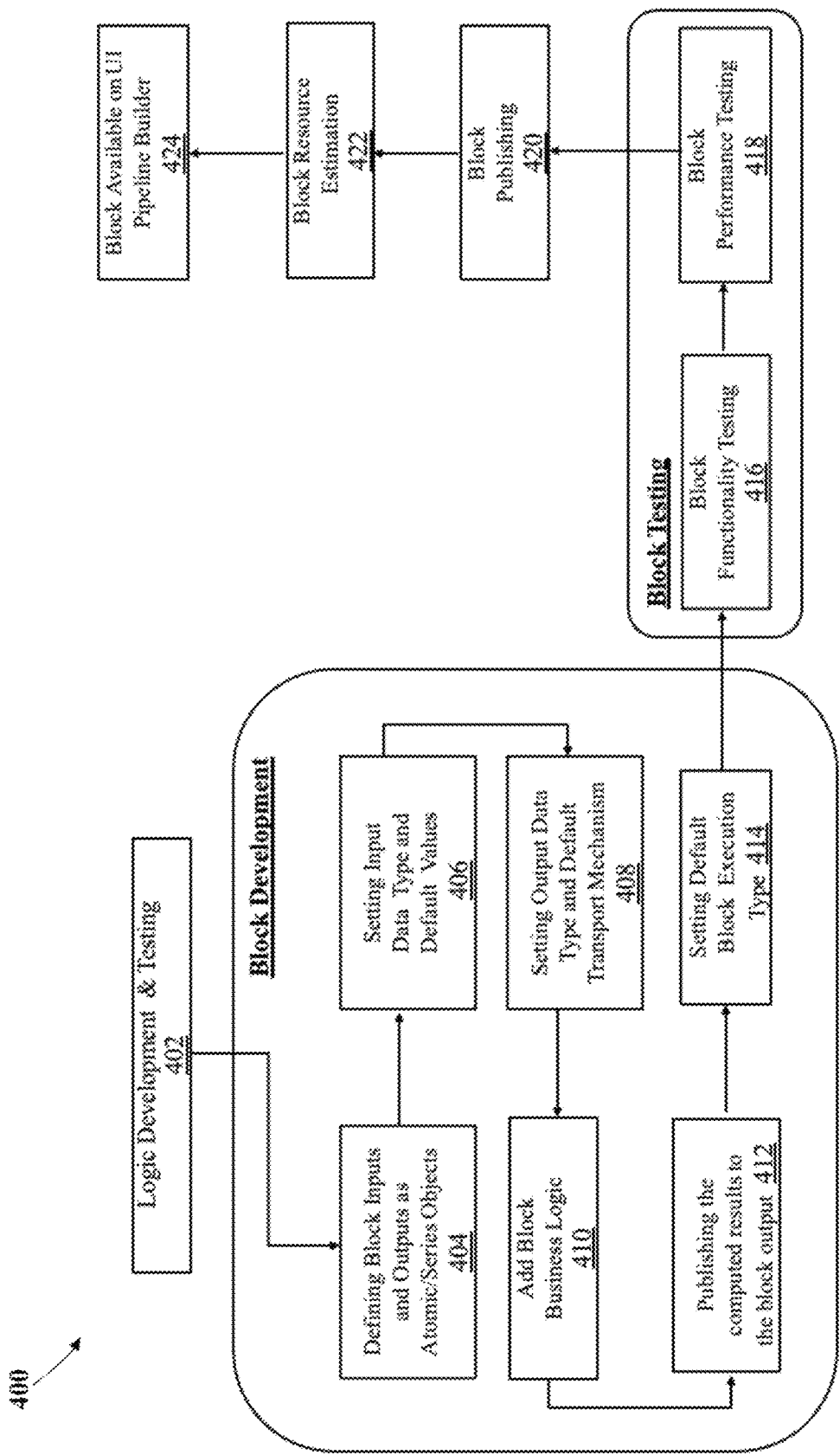
FIG. 4 is a process flow diagram for logic development and testing in creating a block, in accordance with certain aspects of the present disclosure.

Referring now to FIG. 4, a process flow diagram for logic development and testing in a block definition process 400 is shown. In accordance with various aspects of the present disclosure, a block defined by block definition process 400 may comprise, or may otherwise be embodied within, software component 104 (as shown in FIG. 1) and/or block 302 (as shown in FIG. 3). In accordance with various aspects of the present disclosure, block definition process 400 may comprise one or more block intelligence steps including, but not limited to, one or more steps for defining inputs and outputs for a block; classifying an input/output series (for streaming) or atomic data (for single items of data); providing command logic, default execution mode(s), resource requirements and transport modes for a block; and estimating block execution and output size using block-level experiments. Block definition process 400 may be initiated upon executing one or more steps comprising a series of Block Development steps and a Block Testing steps within a logic development and testing process (Step 402). In accordance with certain embodiments, Step 402 is configured to establish one or more non-limiting, specific task, functional requirement, data computation requirements, and/ or application logic, and/or metrics for testing purposes. In various embodiments, one or more use case, business logic, data science analytical, data processing, ML inference, or functional/non-function requirements may guide one or more operations or sub-steps of Step 402. Block definition process 400 may proceed by executing a series of steps 404-414 comprising one or more block development steps within block definition process 400. In accordance with certain embodiments, block definition process 400 may comprise one or more operations for defining block input(s) and output(s) as atomic or series objects based on data type and dataflow requirements (Step 404). Block definition process 400 may proceed by executing one or more operations for setting or configuring one or more block input data type and default values for the block (Step 406). Block definition process 400 may concurrently or sequentially proceed by executing one or more operations for setting or configuring one or more block output data type and default transport mechanism for the block (Step 408). Block definition process 400 may utilize various transport mechanisms or execution modes, data streaming tools/technologies and/ or database support such as BLOCKMON, SPARK STREAMING, APACHE STORM, YAHOO!S4, APACHE SAMZA, APACHE FLINK, APACHE AURORA, REDIS, C-SPARQL, SAMOA, CASSANDRA, MONGODB, XML, KAFKA, HBASE, HIVE FLUME, KINESIS, RCP sockets, TWITTER, SQL, SPOUT, CQELS, ETALIS, XSEQ, IBM INFOSPHERE, GOOGLE MILL-WHEEL, or combinations thereof and the like. Block definition process 400 may proceed by executing one or more operations for configuring a business logic flow for the block (Step 410). Block definition process 400 may proceed by executing one or more operations for publishing the computed results of the block output (Step 412). In accordance with certain embodiments, the computed results of the block output are published and made accessible within AiOS 102 of FIG. 1. Block definition process 400 may proceed by executing one or more operations for setting a default block execution type (Step 414).

Still referring to FIG. 4, in accordance with certain aspects of the present disclosure block definition process 400 may proceed by executing a series of steps 416-418 comprising one or more block testing steps within block definition process 400. Block definition process 400 may proceed by executing one or more operations for block functional testing (Step 416) and block performance testing (Step 418). Step 416 may comprise one or more operations or sub-steps for identifying one or more block functions based on one or more expected performance specifications for the block. Step 416 may further comprise one or more operations or sub-steps for configuring an input data function or an output data function based on one or more specification for the functions. Step 418 may further comprise one or more operations or sub-steps for executing one or more performance test case. One or more performance test case may comprise one or more operations or sub-steps for comparing one or more expected outputs for the block with one or more actual outputs for the block. In accordance with various embodiments, block functional testing (Step 416) and block performance testing (Step 418) may comprise one or more testing methodologies or operations including, but not limited to, symbolic execution, dynamic, concolic testing, differential testing, mutation testing, cross-reference, fuzz testing, or combinations thereof and the like.

In accordance with certain aspects of the present disclosure, block definition process 400 may proceed by executing one or more operations for publishing the block in a block library of the AI OS (Step 420). Block definition process 400 may proceed by executing one or more operations for estimating one or more computing resources for the block based on the block's function, dataflow, and execution requirements (Step 422). In various embodiments, the one or more computing resources may be estimated by using one or more non-limiting methods, such as heuristic, meta-heuristic, rules engine or algorithm based on historical data, data flow simulations, source code static or dynamic tracing, resource management tool, and combinations thereof. Block definition process 400 may proceed by configuring the block for availability within a graphical user interface of the AI OS (Step 424). In accordance with certain embodiments, the graphical user interface of the AI OS may comprise a pipeline builder and may be accessible by a user via SDK 202 of FIG. 2.

Figure 5:
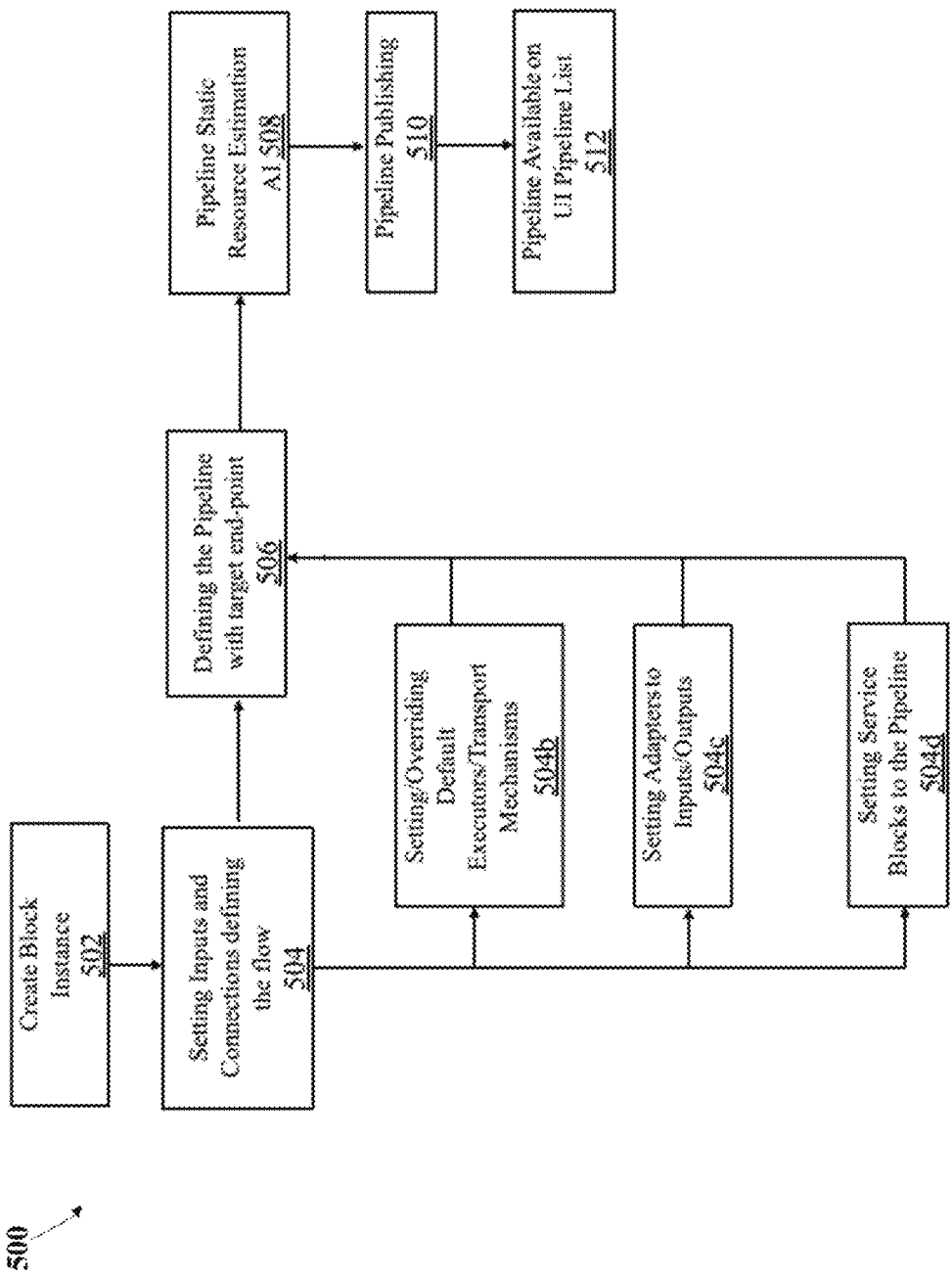
FIG. 5 is a process flow diagram for creating a pipeline, according to an embodiment.

Referring now to FIG. 5, a process flow diagram for a pipeline definition process 500 for creating a pipeline is shown. A pipeline may comprise or otherwise be configured as pipeline 118 of FIG. 1. In accordance with certain aspects of the present disclosure, a pipeline may be configured to enable a data scientist user to perform data science experimentation, exploration, or analysis by arranging and connecting two or more blocks containing defined functions, instances, or objects, to create an end-to-end AI or ML model lifecycle process. In accordance with various embodiments, pipeline definition process 500 may comprise one or more of steps 502-512. Pipeline definition process 500 may comprise one or more pipeline static intelligence operations comprising one or more steps or functions for creating a pipeline by connecting blocks; configuring data transport for an input-output connection between each block as Memory/Queue/Disk/Socket and other mechanisms as may arise; providing adapters to output-input connections as required to facilitate data transfer between two or more blocks; validating blocks, inputs and outputs to ensure consistency of logic, transport, execution and adapters; and estimating pipeline execution resources and data transport constraints. In various embodiments, pipeline definition process 500 may comprise one or more functions for raw data collection, batch and streaming data transport, data engineering, model training, experiment tracking, data provenance, model deployment, model monitoring, or combinations thereof and the like. In accordance with various embodiments, one or more functions of steps 502-512 may be incorporated within a block and annotated by a decorator (e.g., decorator 308 of FIG. 3) for execution by a local or distributed computing system.

In accordance with various aspects of the present disclosure, and still referring to FIG. 5, pipeline definition process 500 may commence with the creation of a block instance (Step 502). In accordance with various embodiments, a block instance may comprise a high-level encapsulation of a task or function required for developing an ML model. In accordance with certain embodiments, a block is instantiated via one or more steps of block definition process 400 of FIG. 4. Pipeline definition process 500 may continue by executing one or more operations for configuring one or more inputs and connections between two or more blocks comprising the pipeline (Step 504). In various embodiments, an input or connection may include, but is not limited to, one or more data set, data stream, data frame, data source, or combinations thereof and the like. Pipeline definition process 500 may continue by executing one or more operations for configuring or defining a target endpoint comprising an output of the pipeline flow (Step 506). An endpoint may include, but is not limited to, any individual or end-to-end AI or ML model life cycle process. In accordance with certain embodiments, step 506 may comprise one or more sub-steps. These sub-steps may be executed in a sequential or non-sequential order either by a user or automatically by the system. In accordance with certain embodiments, pipeline definition process 500 may proceed from step 504 by executing one or more operations for configuring one or more default setting, executor, or transport mechanism through the modification of the source code of a block, or by choosing from a list or a library provided by SDK 202 of FIG. 2 (Step 504*b*). In various embodiments, one or more executor may include, but is not limited to, a distributed or local computational AI or ML library, engine, framework, system, or combinations thereof and the like. In various embodiments, the transport mechanism may include, but is not limited to, data streaming tools/technologies or database support, such as BLOCKMON, SPARK STREAMING, APACHE STORM, YAHOO! S4, APACHE SAMZA, APACHE FUNK, APACHE AURORA, REDIS, C-SPARQL, SAMOA, CASSANDRA, MONGODB, XML, KAFKA, HBASE, HIVE FLUME, KINESIS, RCP sockets, TWITTER, SQL, SPOUT, CQELS, ETALIS, XSEQ, IBM INFOSPHERE, GOOGLE MILL-WHEEL, or combinations thereof and the like. In accordance with certain embodiments, pipeline definition process 500 may proceed from step 504 by executing one or more operations for configuring one or more input or output adapters (Step 504*c*). In certain embodiments, step 504*c* configures one or more input or output adapters according to the requirements of the endpoint defined in step 506. In various embodiments, one or more adapter enables the modification of an output of a block to match the requirement of another block's input. In accordance with certain embodiments, pipeline definition process 500 may proceed from step 504 by executing one or more operations for configuring one or more service block in accordance with the requirements of the endpoint defined in step 506 (Step 504*d*). It is an object of the present disclosure to provide an alternative solution to batch data processing as well as conventional pipelines for executing extract, transform, load (ETL) operations or processes. In various embodiments, service blocks enable real-time, live pipeline execution, ensuring that blocks accept streaming data, accept and service request in real-time. In various embodiments, a service block may be configured to control the flow of messages or data between blocks of a pipeline, keep track of one or more requests, maintaining state, enable the common sharing of services, and as a mechanism for a reduce operation, and enabling real-time interactions with external solutions or applications (e.g., web, mobile apps). In various embodiments, a service block enables robust and flexible integration into applications providing live, real-time, AI or ML pipeline execution. In certain exemplary embodiments, a pipeline automatically generates one or more representational state transfer (REST) endpoints through one or more service block. In various embodiments, one or more endpoints may also include, alternatively or additionally, gRPC, Folder Polling, Message Queue (e.g., KAFKA, ACTIVEMQ, RABBITMQ) MPI, graph query language, Socket Connection, SOAP, and the like. In certain exemplary embodiments, said pipeline enables live mode, continuous operation, synchronous or asynchronous streaming and integration with one or more external applications (e.g., web, mobile apps). The completion of steps 502,504, 504b,504c,504d, and 506 then allows the resources required to execute the pipeline to be estimated using AI or ML (step 508). Once resource estimation is completed, the constructed pipeline is published to a library of the AiOS 102 of FIG. 1 and is made accessible on a UI pipeline list, through SDK 202 of FIG. 2 (Step 512).

Figure 5B:
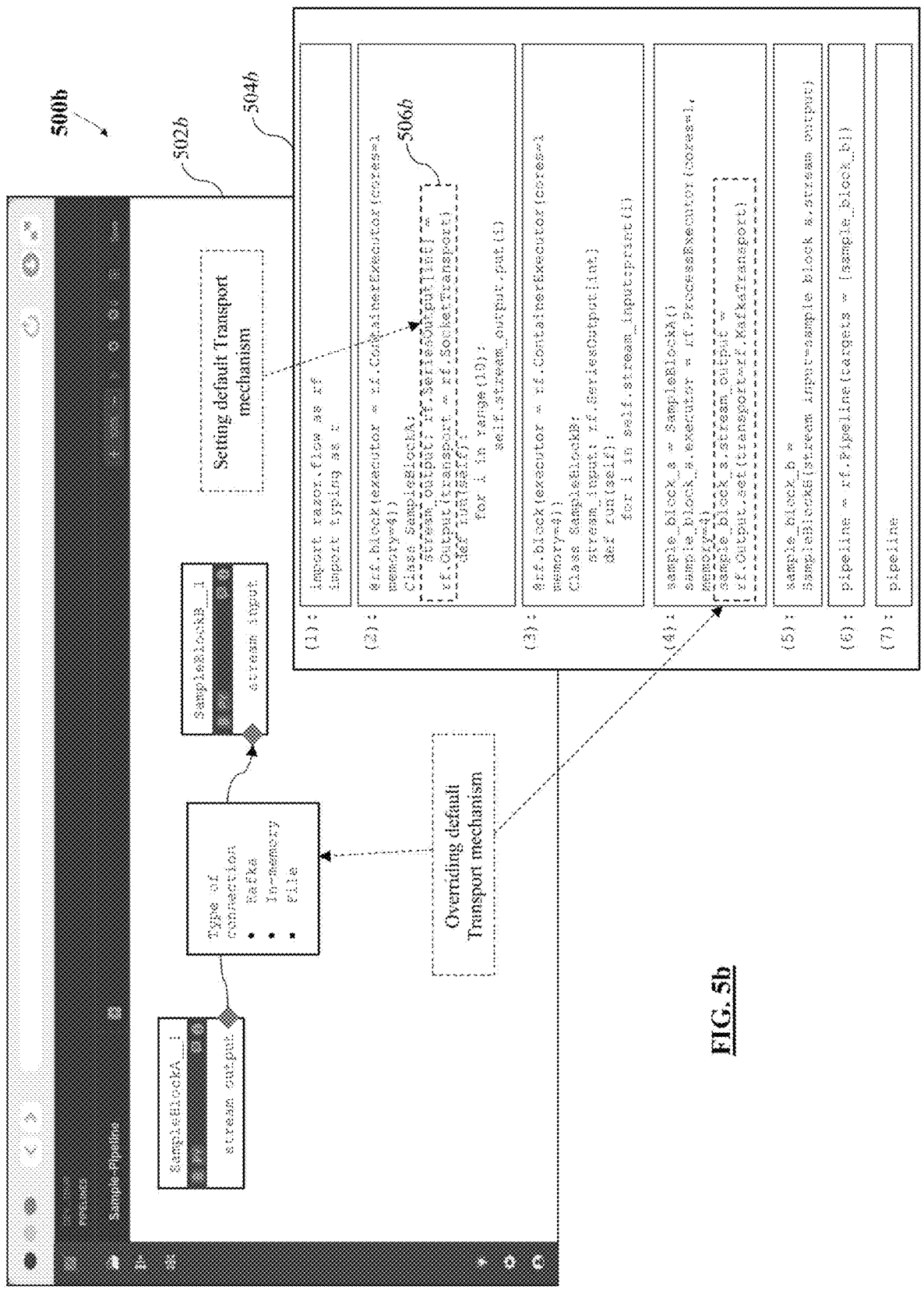
FIG. 5*b* is an interface diagram illustrating the process of declaratively configuring data transport between two blocks, according to an embodiment.

Referring now to FIG. 5b, an interface diagram 500b illustrating the process of declaratively configuring data transport between two blocks is shown. As described above, SDK 202 of FIG. 2 provides an interactive computing environment, which may be embodied as interactive computing environment 502b, configured to enable a user to construct a pipeline using one or more said block 302 of FIG. 3 in a declarative manner. SDK 202 of FIG. 2 may enable user access to one more computing instruction 304 of FIG. 3 that may be written, configured, and/or modifiable. The code is accessible within an interface screen 504b configured to enable a user to view, write, configure, or modify one or more lines of executable instructions. In this example, a user can declaratively configure the data transport process of one block to another block through a class function (e.g., function, instance or class 306 of FIG. 3) within a decorator (e.g., decorator 308 of FIG. 3). This may be accomplished through the instruction line stream output 506b to specify that the data transport mechanism between said blocks is a socket transport.

Certain aspects of the present disclosure provide for an executor engine that enables the execution of one or more said pipeline constructed during pipeline definition process 500 of FIG. 5. An engine comprises one or more managed cluster of computing machines. In various embodiments, one or more engines support one more technology, such as SPARK, FLINK, HOROVOD, VANILLA PYTHONS or combinations thereof and the like. In accordance with certain aspects of the present disclosure, a pipeline execution process comprises one or more operations for pipeline scheduling, pipeline modulation based on data transport mode, dynamic resource allocation, and pipeline robustness and failure management. The executor engine enables, via said mechanisms and said technologies, the orchestration of tasks and pipelines, allocates resources, manages multiple data source interactions, provisioning and terminating resources, manages failovers and restarts, manages messaging, and provides logging and monitoring services. In accordance with various exemplary embodiments, the executor engine may be executed via a local or distributed computing environment at scale, i.e., using large models and data sets.

Figure 6:
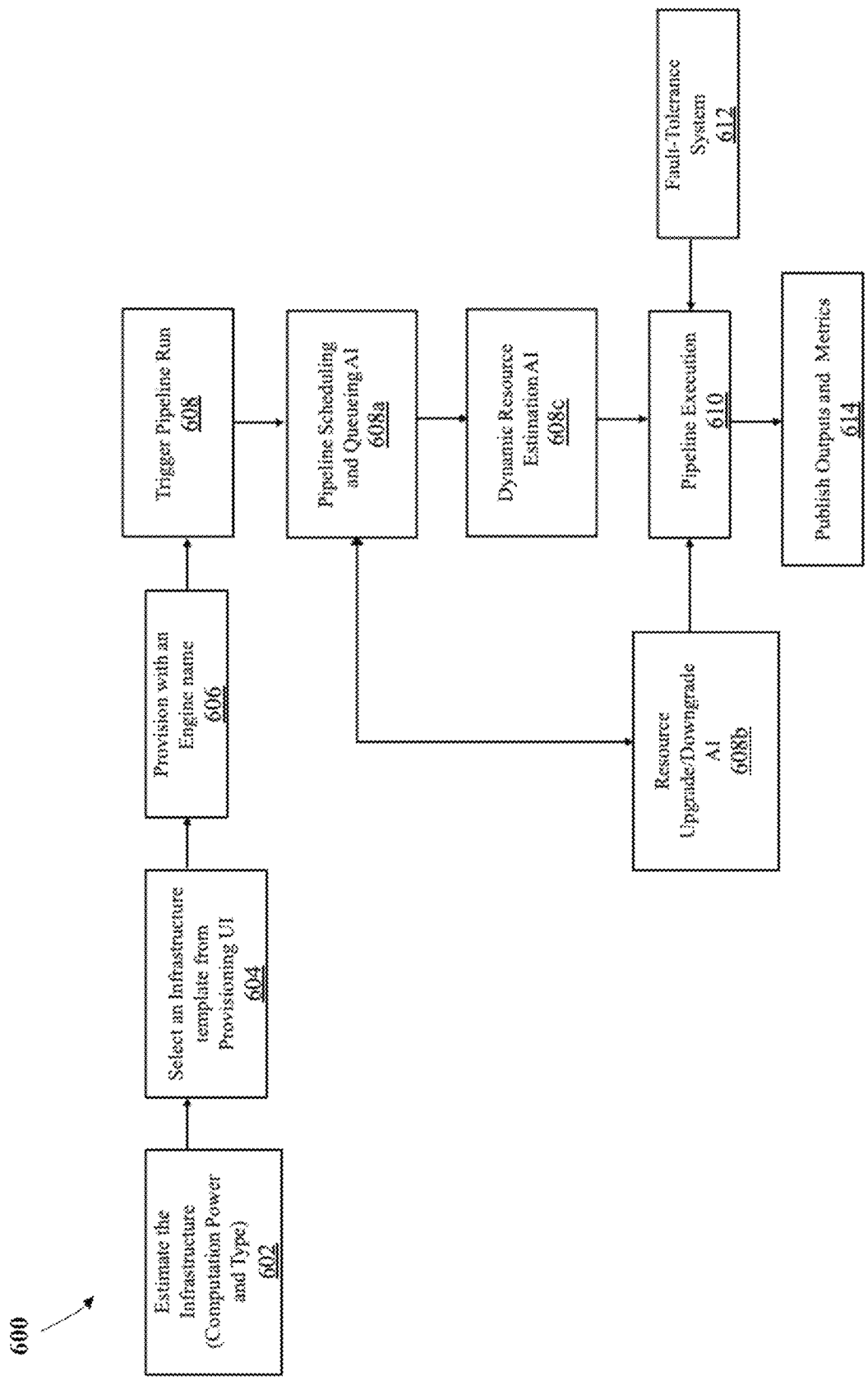
FIG. 6 is a process flow diagram for orchestrating the execution of a pipeline, in accordance with certain aspects of the present disclosure.

Referring now to FIG. 6, a process flow diagram of a pipeline execution process 600, as executed by at least one engine, is shown. In accordance with certain aspects of the present disclosure, pipeline execution process 600 commences by executing one or more operations for estimating the computing infrastructure required to run the instructions coded within each block (Step 602). In accordance with various embodiments, a computing infrastructure may include, but is not limited to, a computing system, type, power, processor speed, memory capacity, or combinations thereof and the like. Based on the output of step 602, pipeline execution process 600 may proceed by executing one or more operations for selecting an infrastructure template from a Provision UI, accessible from SDK 202 of FIG. 2 (Step 604). Pipeline execution process 600 may proceed by executing one or more operations for provisioning the infrastructure with a name (Step 606). Pipeline execution process 600 may proceed by executing one or more operations for running a pipeline in response to an input of a user of OS 102 of FIG. 1 via a UI provided by SDK 202 of FIG. 2 (Step 608). In response to the output of step 608, pipeline execution process 600 may proceed by executing one or more operations for executing a constructed pipeline (Step 610). In accordance with certain embodiments, pipeline execution process 600 may comprise a series of sub-steps 608a-608c for running/executing a pipeline. In accordance with certain embodiments, in sub-step 608a, OS 102 of FIG. 1 executes a pipeline schedule and queuing process using an AI or ML algorithm executed via a local or distributed computing environment at scale, i.e., using large models and data sets (such as a process depends on the setting and blocks and input output configurations). In sub-step 608b, in coordination with step 608a, one or more resource may be upgraded or downgraded, in terms of utilization using another AI or ML algorithm and executed via a local or distributed computing environment at scale, i.e., using large models and data sets. The coordination is depicted by the bi-lateral exchange of data between step 608a and step 608b and subsequent relation of step 608b with pipeline execution step 610. The bi-lateral data exchange subsequently enables the dynamic estimation (sub-step 608c) of resources using another AI or ML algorithm, executed via a local or distributed computing environment at scale, i.e., using large models and data sets. In step 612, a fault-tolerant system is processed to ensure that pipeline execution step 610 is carried without error. In various embodiments, the fault-tolerance system is a free-standing system that detects failures and optimally corrects one more fault to heal the engine. The pipeline outputs and metrics are then published (step 614) to a user through an UI provided by SDK 202 of FIG. 2.

An object of the present disclosure is the use of blocks for the management of metrics published in step 614 of FIG. 6. A metric is a statistic explaining some aspect of the fittedness from a model perspective, tracking performance/usage from a resource perspective or any generic data useful to a block user. For example, accuracy and mean squared errors are two common metrics for classification and regression, respectively. Every block (e.g., block 302 of FIG. 3) in a pipeline run (e.g., step 608 of FIG. 6) will record certain metrics over the course of their execution. In various embodiments, AiOS 102 of FIG. 1 will display these metrics on the pipeline run interface in a 2d-graph. These metrics are stored in a central Metrics repository which is responsible for storing and serving metrics across the platform. In various embodiments, AiOS 102 of FIG. 1 may utilize a combination of MONGODB, INFLUXDB, unstructured, semi-structure data, or the like, as the metrics store. In certain exemplary embodiments, MONGODB is used as an indexing store, which allows searching INFLUXDB entries on partial keys, since INFLUXDB on its own does not allow it. In another embodiment, INFLUXDB is employed to maintain metrics which are series or time series in nature, as INFLUXDB is optimized for it. In various embodiments, the AiOS 102 of FIG. 1 provides one or more application programming interface (API), preferably constructed using a notebook, such as JUPYTER NOTEBOOK, GOOGLE COLAB and the like. In various embodiments, the AiOS 102 of FIG. 1 provides a metric server and a model lifecycle manager via one or more engine. In certain exemplary embodiments, a user can use one or more supported graphs and charts on the metrics server including, but not limited to, Line Graph, Bar Chart, Pie chart, Confusion metrics, Simple Point Metric, Scatter Graph, Box Graph, Heat Map. In various embodiments, the AiOS 102 of FIG. 1 logs three different kinds of metrics: Hardware, System/Deep Learning, and User-defined metrics. For Hardware Metrics, all blocks in a pipeline run are monitored and tracked for their respective CPU, GPU, and Memory usage. In various embodiments, these data-points are published to the metrics server for real-time display to user during pipeline execution. In various embodiments, certain blocks and Deep Learning (DL) models have predefined metrics. For example, a DL Model has accuracy, AUC, F1 Score, etc. The cost function of a DL Model may publish a metric graph, for example, MSE, RMSE, cross-entropy, etc. Other examples may include a DL Model Train block configured to display the data read speed as a metric. In various embodiments, SDK 202 of FIG. 2 provides APIs that a user can use to publish data from a block. This data may be saved and served from the central metrics server.

In accordance with various aspects of the present disclosure, the pipeline execution process 600 of FIG. 6 may be incorporated into one or more software module for controlling block and pipeline tasks, functions, and subprocesses. In certain embodiments, an execution engine may execute the one or more software module to coordinate pipeline elements, processes, and functions by configuring specifications, allocating, elastic provisioning-deprovisioning execution of resources, and the control of task transports to local and external resources, enabling a block or pipeline script to be transported to and from computing resources, and accessing and retrieving resources via one or more API. In various embodiments, task execution may be conducted on one or more target resources including, but not limited to, a cloud server, multi-core workstations, distributed computing systems, supercomputers, or combinations thereof and the like. In accordance with various exemplary embodiments, an executor engine may enable user-defined scaling or configuration for a pipeline execution. A configuration may comprise the details of an external computing system, connection channel, communication protocol, technology binding, memory allocation, queues, computing duration, and data transport/management options. In various embodiments, the executor engine automatically configures and executes tasks based on derived heuristics, and/or one or more historical test cases tuned to common execution patterns, to determine the optimal resource allocation strategy for a user-defined ML pipeline. In various embodiments, the execution engine constructs and/orchestrates execution using a task or task dependency graph containing all the state for a pipeline program that is mapped to available execution resources. In various embodiments, a task graph is represented as a directed acyclic graph (DAG), preferably a dynamic task graph. In various embodiments, the execution engine performs a variety of functions, including but not limited to, tracking information in a data structure, deriving and resolving dependencies, storing-receiving metadata and/or future data or results from asynchronous operations or call backs, performing fault-tolerant, processing exceptions and execution errors, and combinations thereof or the like. In various embodiments, the execution engine control logic is derived from one or more annotated decorators of one or more said blocks, enabling asynchronous, parallel, portable execution of heterogenous pipeline workloads, independent of resource locations or constraints.

In accordance with certain exemplary embodiments, the execution engine may utilize one or more graphs with dynamic topologies that can depend on runtime data and support execution of one or more pipeline. At runtime, a pipeline may be converted in a directed acyclic graph (DAG) of individual block (jobs), where the edges represent control dependencies. In accordance with certain embodiments, a control flow may be executed in the Python interpreter and the dataflow may be executed by one or more said decorators that fire off the appropriate mechanisms. A dataflow graph may consist of nodes and edges, where each node represents an instantiation of an operation, and values flow along the edges. The operations may be implemented by kernels that can be run on types of devices (for instance, CPUs or GPUs). In various embodiments, a dynamic dependency graph maps the task graph to arbitrary execution resources, exploiting parallelism where possible by tracking the creation of data (objects or files) and determining when dependencies are met. In certain exemplary embodiments, AiOS 102 of FIG. 1 comprises a modular execution architecture that supports a variety of execution models ranging from small-scale pipeline to large scale, big data sets, on local or distributed computing systems as well as supercomputers. In various embodiments, AiOS 102 of FIG. 1 is configured to assemble and dynamically update a task dependency graph.

Certain objects and advantages of the present disclosure is an AI OS (e.g., AiOS 102 of FIG. 1) that supports the following:
1. Block Intelligence: This is the building block of the pipelines that are run. They need to be estimated clearly in terms of the resources that they require (which depends on the inputs provided), as well as the size and volume of outputs that they produce (both batch and streaming). In various embodiments, many test cases are generated under varying conditions and testing the block against these. The data thus gathered is used to build ML models which can predict their performance based on the inputs provided.
2. Pipeline Static Intelligence: One or more algorithms can cascade estimates based on specific blocks and their parameters. This allows for overall pipeline resource estimation based on few parameters. This intelligence is primarily algorithmic in nature.
3. Pipeline Dynamic Intelligence: While static intelligence provides overall resource requirements, there are situations where loads on common resources can spike. In various embodiments, the engine modulates running blocks so that the system does not get overloaded using heuristic knowledge.
4. Pipeline Resource Allocation: This does both static and dynamic resource allocation for the pipeline based on heuristic knowledge or machine/deep learning models.
5. Pipeline Scheduling: In various embodiments, scheduling considering desired start and completion times, delays and resource constraints to decide when to schedule pipelines and blocks based on heuristic knowledge.

Figure 6B:
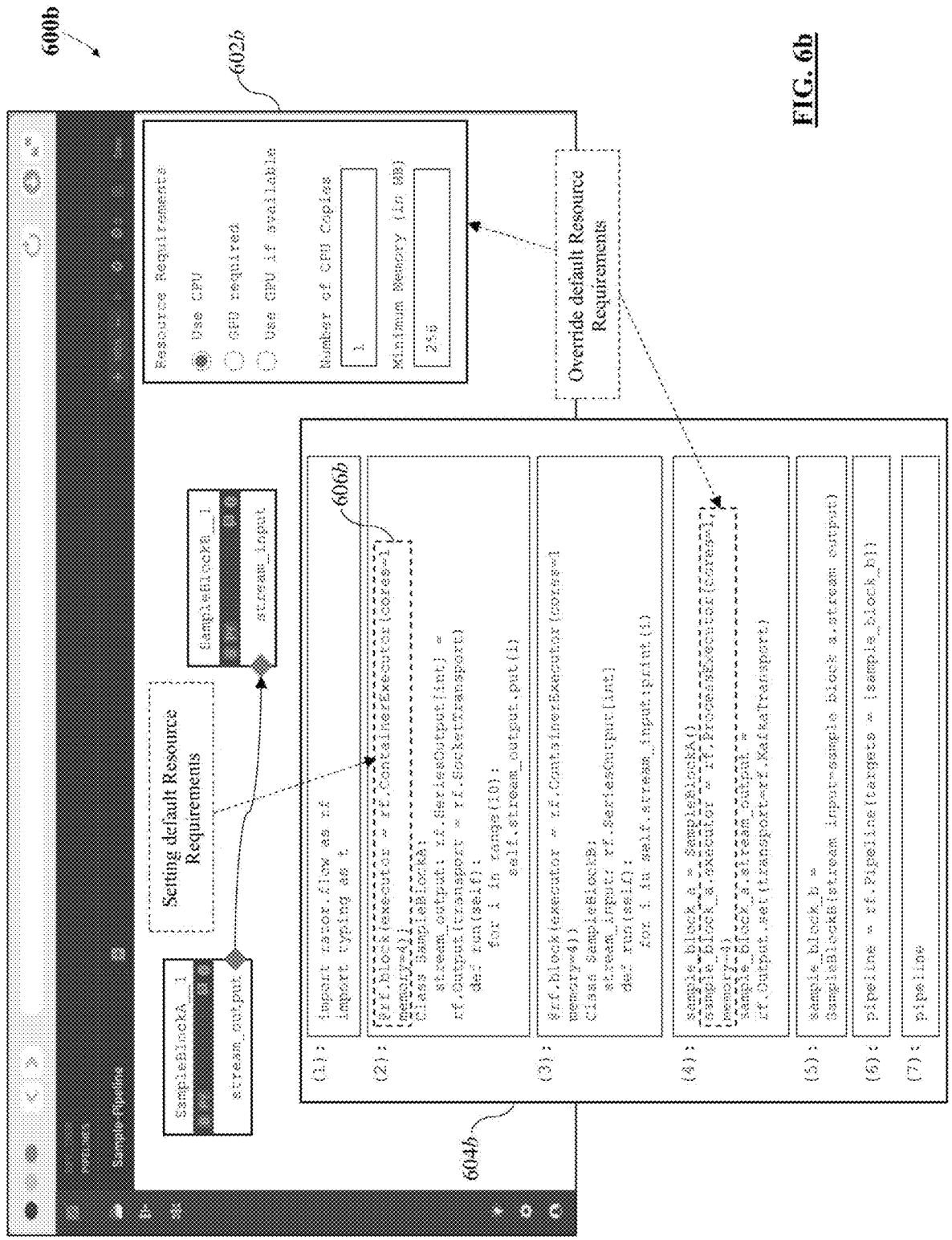
FIG. 6b is an interface diagram illustrating the process of declaratively configuring the computing resources for pipeline execution, according to an embodiment.

Referring now to FIG. 6b, an interface diagram 600b illustrating the process of declaratively configuring a pipeline resource is shown. As described above, SDK 202 of FIG. 2 provides an interactive computing environment, which may be embodied as an interactive computing environment 602b, that enables a user to construct a pipeline using one or more said block 302 of FIG. 3 in a declarative manner. SDK 202 of FIG. 2 may enable user access to one more computing instruction 304 of FIG. 3 that may be written, configured, or modifiable. The code is accessible within an interface screen 604b configured to enable a user to view, write, configure, or modify one or more lines of executable instructions. In this example, a user can declaratively configure the deployment resource of a pipeline process through a decorator (e.g., decorator 308 of FIG. 3). This may be accomplished through a decorator instruction line 606b to specify CPU cores and memory resources. As shown in FIG. 6b, the resource requirements for pipeline execution are to be executed using one CPU core and a minimum of 256 MB of memory.

Figure 7:
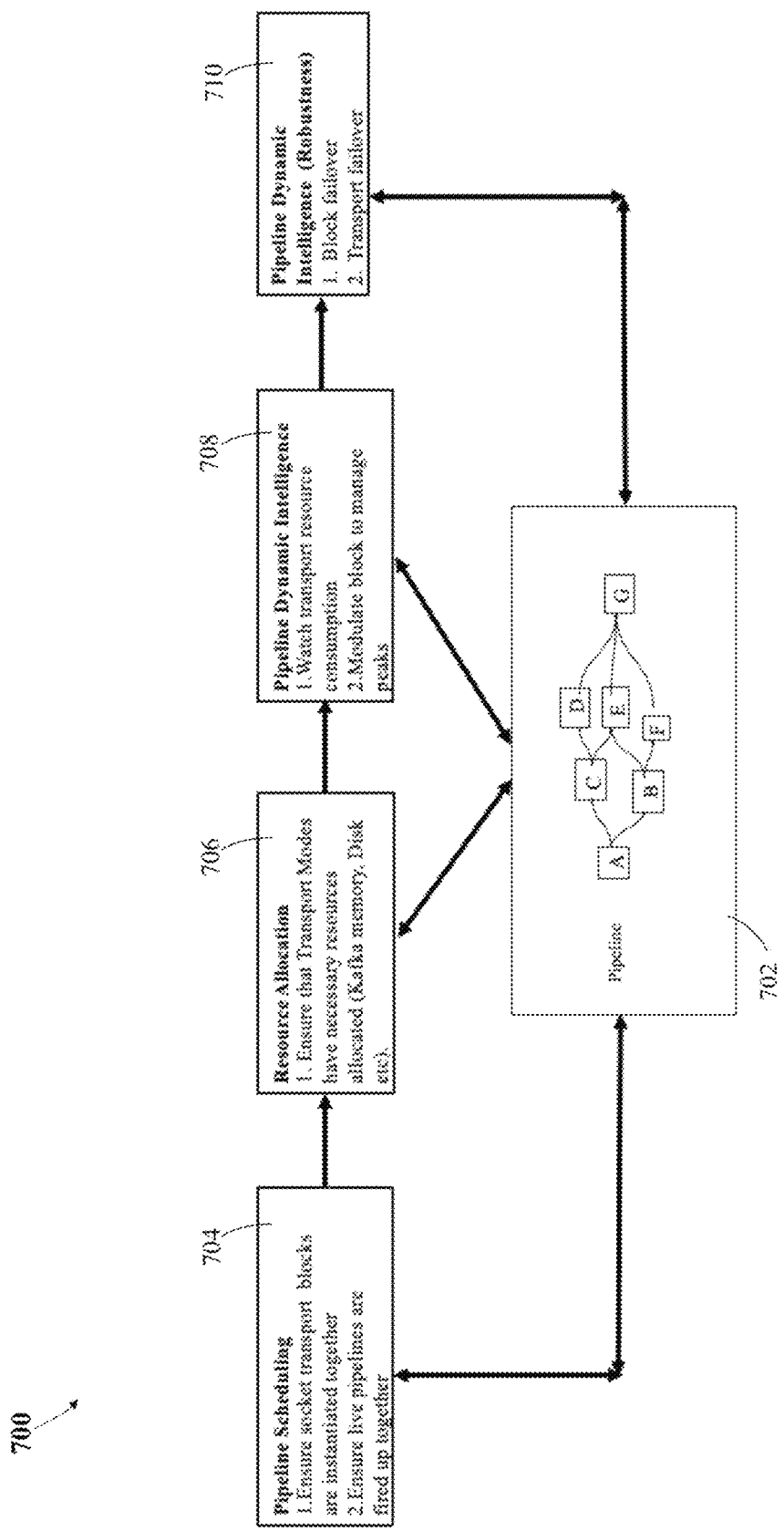
FIG. 7 is a process flow diagram for the pipeline intelligence process, in accordance with certain aspects of the present disclosure.

Referring now to FIG. 7, a process flow diagram for the pipeline intelligence process 700 is shown. According to certain aspects of the present disclosure, pipeline intelligence process 700 may comprise one or more steps 704-710 for the intelligent management of a pipeline 702. In accordance with certain exemplary embodiments, pipeline intelligence process 700 may comprise a pipeline scheduling step 704, a resource allocation step 706, a resource execution monitoring step 708, and fault-detection step 710. In accordance with certain exemplary embodiments, step 704 may comprise one or more operations for ensuring that socket transport blocks are instantiated concurrently, and real-time executing pipelines are functioning operatively. In accordance with certain alternative embodiments, step 704 may comprise one or more operations for ensuring that transport mode blocks are instantiated concurrently, and real-time executing pipelines are functioning operatively. In accordance with certain exemplary embodiments, step 706 may comprise one or more operations for optimally allocating one or more computing memory resources according to one or more algorithm, rules engine or derived heuristic. In various embodiments, one or more streaming, cache, combinations thereof, or the like data set, data flow, data frame, data source (e.g., Kafka, disk, etc.) may be allocated to one or more memory space. In accordance with certain exemplary embodiments, step 708 may comprise one or more operations for monitoring computing resource consumption and modulating the activities of one or more blocks to manage peak utilization optimally. In accordance with certain exemplary embodiments, step 710 may comprise one or more operations for dynamically managing fault tolerance and ensuring operation robustness. In various embodiments, block operations are monitored to mitigate one or more faults including, but not limited to, block failover, transport failover, or combinations thereof and the like. In various embodiments, one or more configurable transport mechanism enables the transfer of streaming, or file, or data memory between two blocks arranged within a pipeline. In various embodiments, the transport mechanism provides access to live data sources including, but not limited to, chat, streaming video, or combinations thereof and the like. In various embodiments, an adapter enables the conversion of one or more data frame to satisfy the input requirements of a block arranged within a pipeline. In various embodiments, the output of a block is adapted or modified as batch-by-batch or atomic, contiguous streaming dataset. In various embodiments, pipeline intelligence process 700 enables a service block to interact with an external resource or application in real-time, via streaming data, for receiving and processing one or more service requests.

Figure 7B:
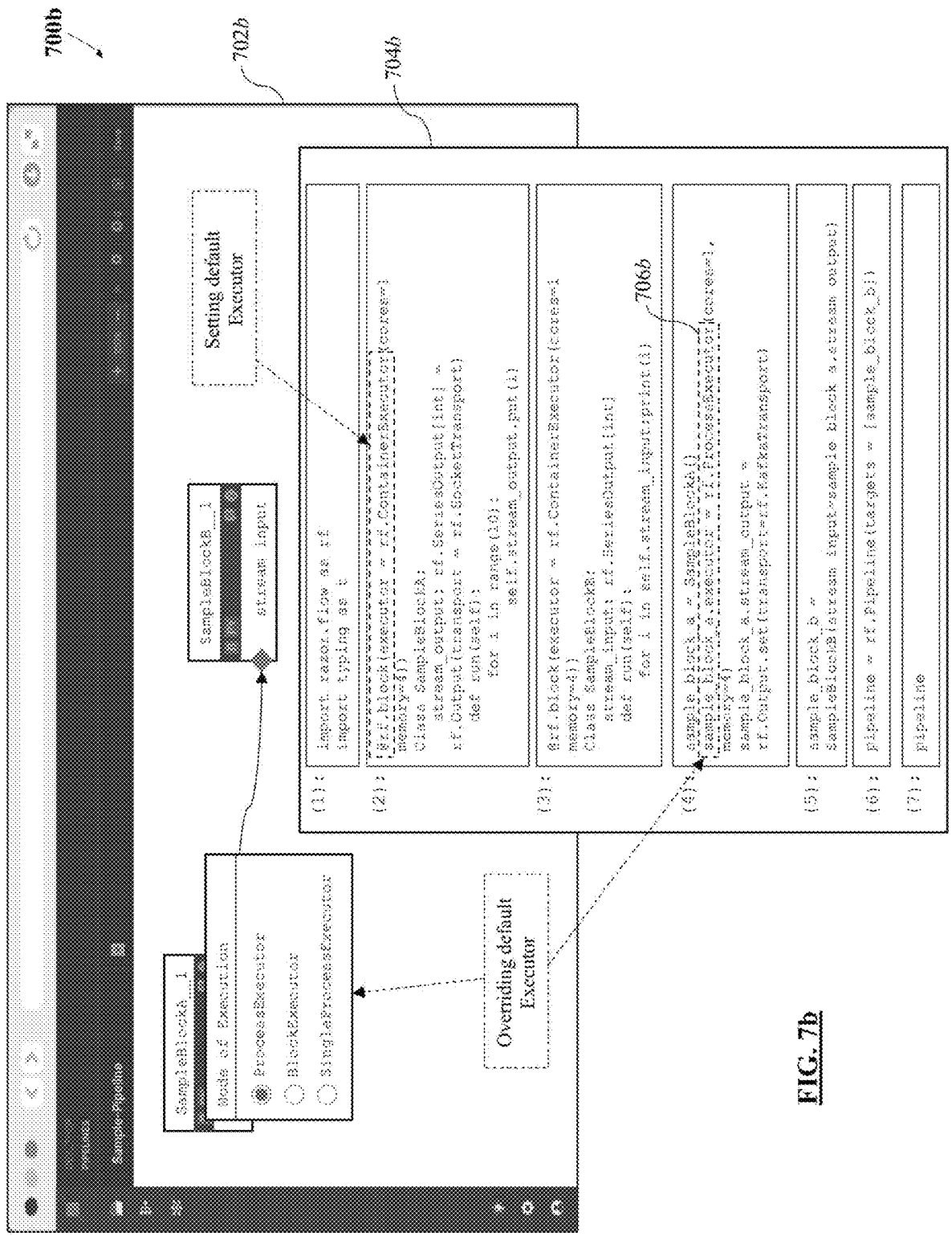
FIG. 7b is an interface diagram illustrating the process of declaratively configuring the executor of a pipeline, according to an embodiment.

Referring now to FIG. 7b, an interface diagram illustrating the process of declaratively configuring a pipeline executor is shown. As disclosed above, SDK 202 of FIG. 2 provides an interactive computing environment, which may be embodied as interactive computing environment 602b, configured to enable a user to construct a pipeline using one or more said block 302 of FIG. 3 in a declarative manner. SDK 202 of FIG. 2 may enable user access to one more computing instruction 304 of FIG. 3 that may be written, configured, or modifiable. The code is accessible within an interface screen 704b that enables a user to view, write, configure, or modify one or more lines of executable instructions. In this example, a user can declaratively configure the deployment resource of a pipeline process through a decorator (e.g., decorator 308 of FIG. 3). This may be accomplished through decorator instruction line 706b to specify, for example, that the resource is a container.

Figure 8:
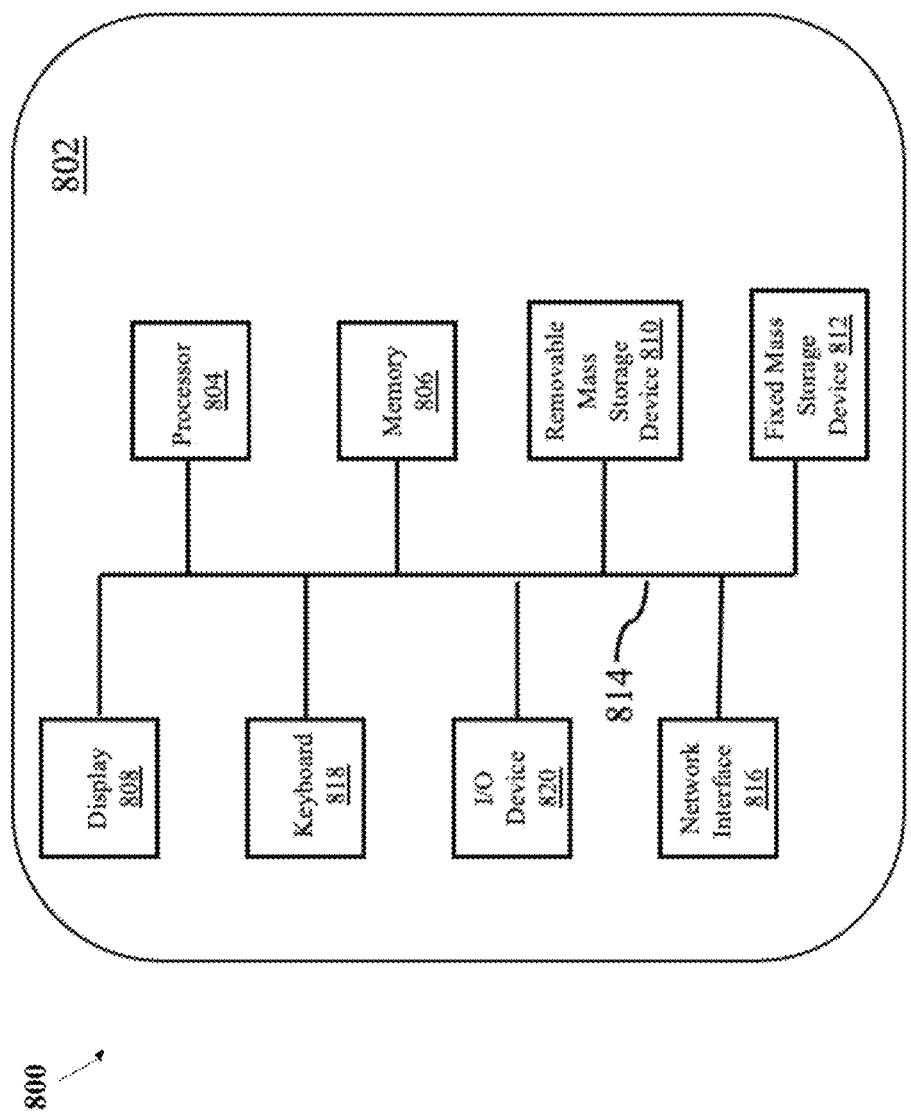
FIG. 8 is a functional block diagram illustrating a computer/server system for executing the AI operating system, block creation, pipeline creation, and pipeline processes.

Referring now to FIG. 8, a functional block diagram 800 illustrating a computer/server system 802 suitable to execute the various embodiments of AiOS 102 of FIG. 1 is shown. As will be apparent, other computer system architectures and configurations can be used for the construction of blocks, pipeline, engine, executors, transporters, and adapters of the present disclosure. In accordance with various exemplary embodiments, computer system 802 may comprise various sub-systems as described below, includes at least one microprocessor subsystem, also referred to as a processor or a central processing unit ("CPU") 804. For example, processor 804 can be implemented by a single-chip processor or by multiple cores and/or processors. In some embodiments, processor 804 is a general-purpose digital processor that controls the operation of the computer system 802. Using instructions retrieved from memory 806, the processor 804 controls the reception and manipulation of input data, and the output and display of data on output devices, for example, display 808. In various embodiments, processor 804 is coupled bi-directionally with memory 806, which can include a first primary storage, typically a random-access memory ("RAM"), and a second primary storage area, typically a read-only memory ("ROM"). As is well known in the art, primary storage can be used as a general storage area and as scratch-pad memory and can also be used to store input data and processed data. Primary storage can also store programming instructions and data, in the form of data objects and text objects, in addition to other data and instructions for processes operating on processor 804. Also as well known in the art, primary storage typically includes basic operating instructions, program code, data and objects used by the processor 804 to perform its functions, for example programmed instructions. For example, primary storage devices can include any suitable computer-readable storage media, described below, depending on whether, for example, data access needs to be bi-directional or unidirectional. For example, processor 804 can also directly and very rapidly retrieve and store frequently needed data in a cache memory, not shown. The processor 804 may also include a coprocessor (not shown) as a supplemental processing component to aid the processor and/or memory 806.

In various embodiments, a removable mass storage device 810 provides additional data storage capacity for the computer system 802 and is coupled either bi-directionally (read/write) or unidirectionally (read only) to processor 804. For example, storage 810 can also include computer-readable media such as flash memory, portable mass storage devices, holographic storage devices, magnetic devices, magneto-optical devices, optical devices, and other storage devices. A fixed mass storage 812 can also, for example, provide additional data storage capacity. One example of mass storage 812 is an eMMC or microSD device. In one embodiment, mass storage 812 is a solid-state drive connected by a bus 814. Mass storage 812 generally stores additional programming instructions, data, and the like that typically are not in active use by the processor 804. It will be appreciated that the information retained within mass storage 812 can be incorporated, if needed, in standard fashion as part of primary storage 806, for example RAM, as virtual memory.

In addition to providing processor 804 access to storage subsystems, bus 814 can be used to provide access to other subsystems and devices as well. As shown, these can include a display monitor 808, a communication interface 816, a touch (or physical) keyboard 818, and one or more auxiliary input/output devices 820 including an audio interface, a sound card, microphone, audio port, audio recording device, audio card, speakers, a touch (or pointing) device, and/or other subsystems as needed. In addition to a touch screen and/or capacitive touch interface, the auxiliary device 820 can be a mouse, stylus, track ball, or tablet, and is useful for interacting with a graphical user interface.

The communication interface 816 allows processor 804 to be coupled to another computer, computer network, or telecommunications network using a network connection as shown. For example, through the communication interface 816, the processor 804 can receive information, for example data objects or program instructions, from another network, or output information to another network while performing method/process steps. Information, often represented as a sequence of instructions to be executed on a processor, can be received from and outputted to another network. An interface card or similar device and appropriate software implemented by, for example executed/performed on, processor 804 can be used to connect the computer system 802 to an external network and transfer data according to standard protocols. For example, various process embodiments disclosed herein can be executed on processor 804 or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, TCP/IP, intranet, local-area network ("LAN"), home-area network ("HAN"), serial connection, parallel connection, wide-area network ("WAN"), Fibre Channel, PCI/PCI-X, AGP, VLbus, PCI Express, Express-card, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, I-Wire, UNI/O, or any form of connecting homogenous, heterogeneous systems and/or groups of systems together. Additional mass storage devices, not shown, can also be connected to processor 804 through communication interface 816.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems may also be utilized.

In accordance with various exemplary embodiments, AiOS 102 of FIG. 1 provides a user access to a free-standing command line interface (CLI). In various embodiments, the CLI (e.g., CLI 210 of FIG. 2) allows users to specify, declare, and run tasks, execute pipelines locally, sync data and code, sync run and result output, track local experiments, publish a block or pipeline into a database, or the like. In various embodiments, the CLI enables a secured connection to a cloud platform to execute one more task using a secure shell (SSH) network protocol. In accordance with various exemplary embodiments, AiOS 102 of FIG. 1 provides a user a graphical user interface (GUI) to create a pipeline by dragging and dropping blocks onto a canvas, as provided by SDK 202 of FIG. 2, and connecting them to rapidly create pipelines, manage executors, transport mechanisms, and adaptors. In various embodiments, the computing system executes instructions encapsulated within a block, including but not limited to, annotated decorator function, instance, class, or object, enabling the sequential, parallel, synchronous, asynchronous, or concurrent completion of one or more said tasks of an end-to-end AI solution, application, ML model development, deployment, product lifecycle, or combinations thereof and the like.

Figure 9:
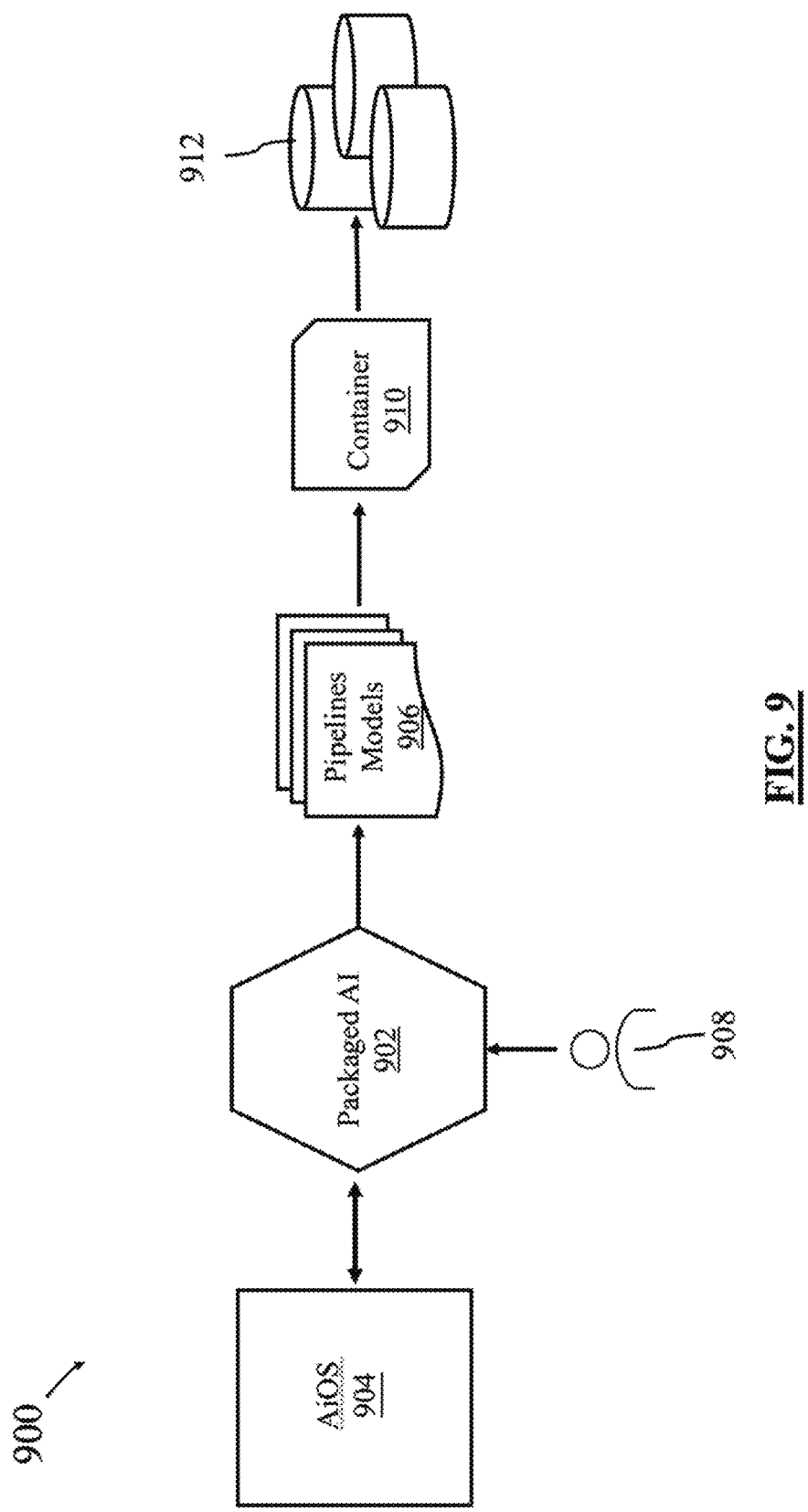
FIG. 9 is a functional block diagram of a Packaged AI in relation to the AiOS, in accordance with certain aspects of the present disclosure.

A Packaged AI in accordance with certain aspect of the present disclosure is intended to further accelerate the creation, development, production, and deployment of one or more AI, AI product, or AI solution(s). The system enables, for example, a non-data scientist business analyst, or the like, to build powerful and robust AI and deploy such AI in an enterprise architecture. Referring now to FIG. 9, a diagram of a Packaged AI in relation to an AiOS is shown. The production of an AI product or the like comprises the working of a Packaged AI 902 in conjunction with AiOS 904 (i.e., AiOS 102 of FIG. 1) to produce one or more pipelines/models 906, created using one or more block, pipeline, or engine constructed using the AiOS and SDK disclosed herein. A user 908, for example, a data scientist or a non-specialist (e.g., a business analyst) uses Packaged AI 902 to rapidly create and deploy AIs, leveraging pre-existing tools of AiOS 904 to reduce deployment time ranging from weeks to a preferably a day or less. If a user 908 requires a modification to an existing Packaged AI 902, the modifications can be done by a data scientist typically in less than 48 hours, thus allowing the rapid construction and maintenance of AI's by various users. In various embodiments, one or more AI product or solution is delivered via container 910 to a distributed cloud computing environment 912 as a model serving core. In various embodiments, container 910 comprises one or more container technologies, including but not limited to, Linux Container (LXC), OpenVZ, Windows Hyper-V Container, DOCKER, Windows Server Container, rkt, LXD, Oracle Solaris Container, Amazon EC2 Container Service, Google Container Engine, Microsoft Azure Container Service, Joyent Triton, Kubernetes, Swarm, Marathon, Cloudify, combinations thereof, or the like. In a preferred embodiment, container 910 is a DOCKER container providing benefits in terms of a standalone application, repeatability, ease of configuration, and container management. A container manager provides a set of API to manage the life cycle of the container, consisting of the following phases: Acquire, Build, Deliver, Deploy, Run and Maintain. Acquire enables the selection downloading of a container image from a container repository (e.g., DOCKER Hub), and to use it as the base layer on top of which the application will be containerized. The Build phase enables all the Packaged AI 902 components, libraries, and resulting artefacts and data to be packaged in the container image for publishing thereafter. Delivery addresses any concerns to bring in production and could also include a vulnerability analysis step. Deploy involves deploying the application and maintaining it up-to-date, for instance, preferably using a continuous delivery model. The Run phase sets the management system and runtime environment (e.g., scaling policy, health check, recovery policies). The final step is to maintain the application at run-time and off-line. DOCKER has been designed as a container management system and is becoming the de-facto standard. DOCKER is compliant with the cloud portability framework TOSCA. In addition, portability is supported by the Open Container Initiative (opencontainers.org), created to define a standard image format and a standard run-time environment for containers. In various embodiments, said container manager can be deployed as an on-premise or as a managed solution. In various embodiments, the on-premise solution is installed, configured and managed on one or more private datacenter or on virtual machines running in the cloud or geo-distributed infrastructure such as distributed cloud computing environment 912; for example, as a service. In various embodiment, the model serving core can plugged into a batch prediction pipeline or a real-time serving containers. In a real-time mode, the serving core is hosted by, for example, but not limited to, one or more RPC services. In various embodiments, container orchestration enables the selection, deployment, monitoring, and dynamic control of one or more configuration or Packaged AI 902 in a distributed cloud computing environment.

Figure 10:
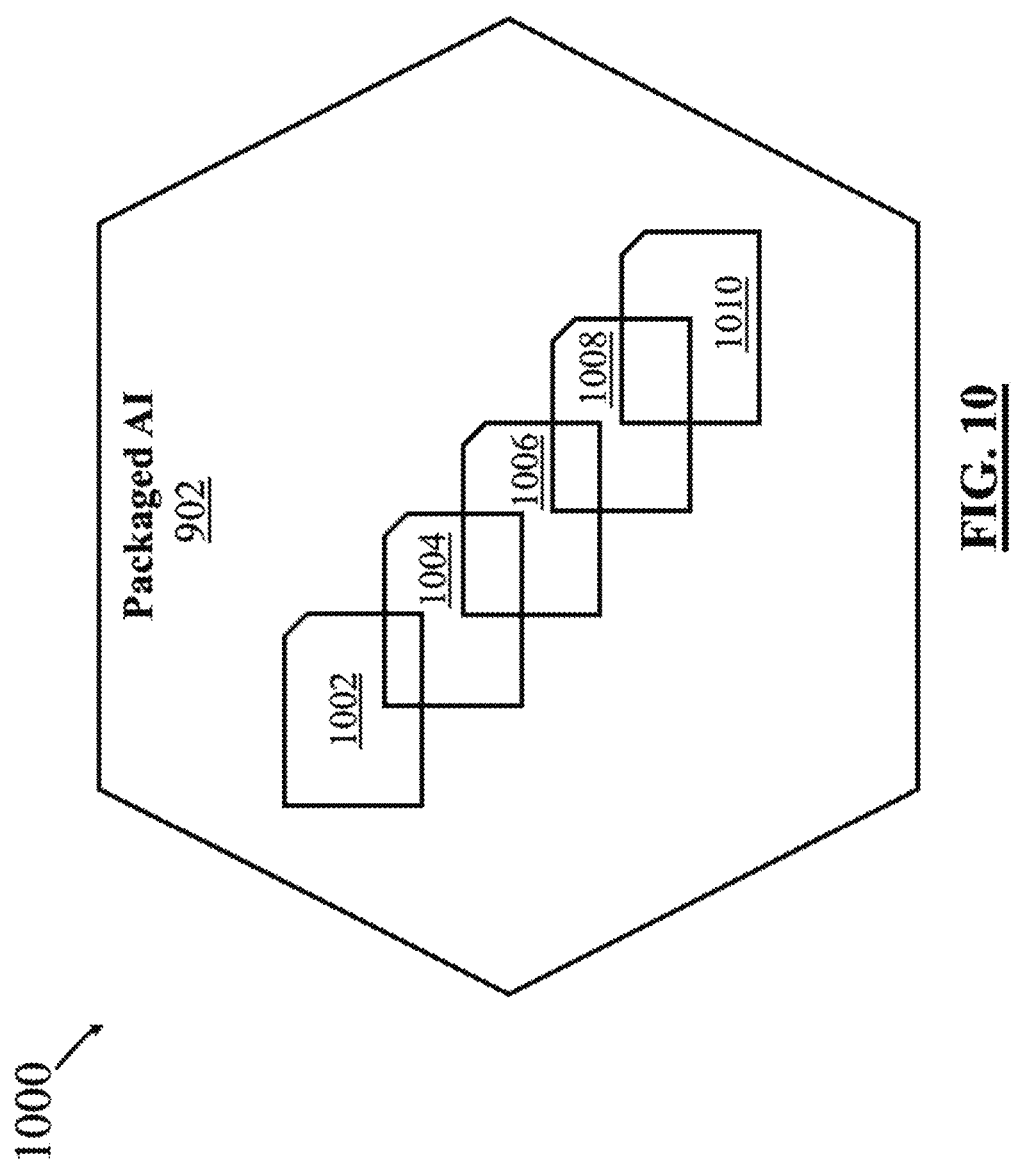
FIG. 10 is a functional block diagram of components of Packaged AI, in accordance with certain aspects of the present disclosure.

In accordance with certain aspects of the present disclosure, Packaged AI 902 may comprise one or more components that enables a user to rapidly create an AI product or solution. Referring to FIG. 10, a collection 1000 of components of a Packaged AI, is shown. In various embodiments, Packaged AI 902 provides user 908 of FIG. 9 a general component 1002, an image handling component 1004, structured data handing component 1006, document handling component 1008, and text handling component 1010. General component 1002 provides user 909 with the capabilities, including but not limited to, uploading one or more file into a project space for subsequent model training. In various embodiments, one or more use cases for component 1002 includes providing a user with the ability to upload one or multiple files, organize files into folders, observe the status of file loading, connect a data source to the downloadable container 910 of FIG. 9, and preview the uploaded data. In a similar manner, image handling component 1004 provides user 908 of FIG. 9 with the capability of previewing an image as well as mark and annotate one or more objects within an image. Similarly, structured data handling component 1006 provides user 908 of FIG. 9 with the capabilities of previewing files, including but not limited to, CSV, XLSX, SQL files, or the like. Yet similarly, document handling component 1008 and text handling component 1010 provides user 908 of FIG. 9 with the capabilities of previewing PDF, text, and documents scanned as images, or the like.

Figure 11:
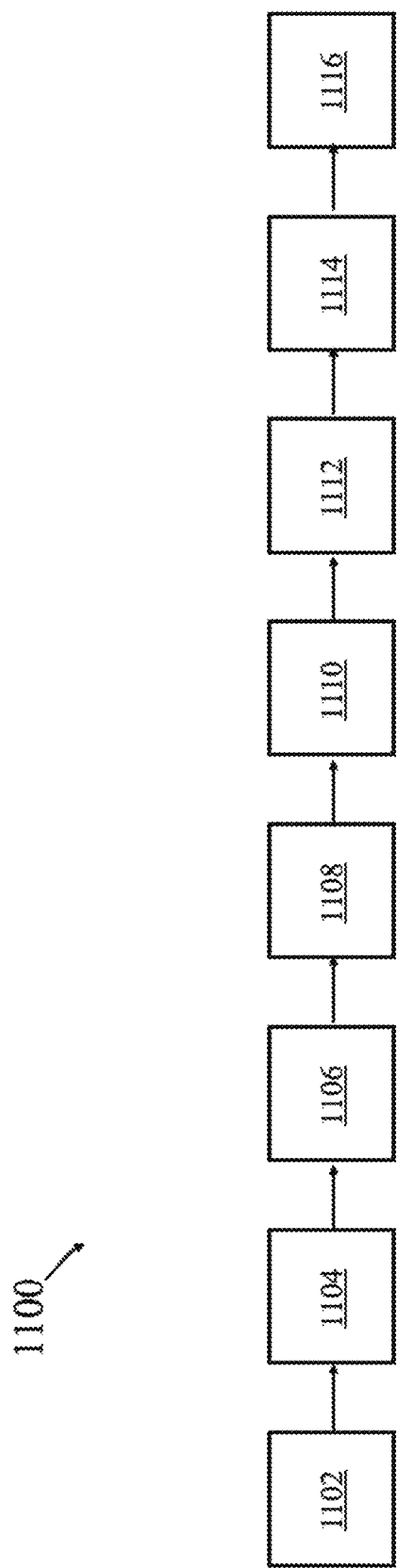
FIG. 11 is a process flow diagram for creating a Packaged AI, in accordance with certain aspects of the present disclosure.

In an exemplary embodiment, a Packaged AI is created for the analysis of a document containing, for example, the London Interbank Offered Rate (LIBOR), a benchmark interest rate for the purpose of rewriting each occurrence within a document to a new standard rate such as SOFR). Referring now to FIG. 11, a process 1100 of creating a Packaged AI is shown. The process comprises uploading data (Step 1102); using document handing component 1008 of FIG. 10, prepare data (Step 1104); review the constructs (Step 1106) identified by the AI in each document and label them; provide the specific questions (Step 1108) that the user may want to ask, and the logic in simple terms, provide indicators (Step 1110) for identifying the type of document, if any; train AI (Step 1112), using the resources of AiOS 102 of FIG. 1; evaluate (Step 1114) AI; and export (Step 1116) the AI. Step 1116 enables user 908 of FIG. 9 to download a container 910 of the AI (e.g., as shown in FIG. 9) which contains the AI that can be deployed in distributed cloud computing environment 912 of FIG. 9. In an alternative embodiment, the AI is deployed to a local container, which can in turn be deployed in the user's infrastructure. In addition, this AI can be burned on an image supplied by the user, thereby making the transition to production much easier. In another exemplary embodiment, an analysis of images and parts of an image to classify people or objects can be conducted using the said steps. The upload data step 1102 in this case are images that could be any supported format (e.g., JPG, PNG, etc.). In Step 1106, the user can label a select subset of images appropriately. In Step 1110, the user can annotate parts of images using available shapes (e.g., circle, polygon, etc.) and tag them appropriately.

In another exemplary embodiment, a Packaged AI incorporates data simulation or synthetic data generation in the building of ML models. In various embodiments, Packaged AI 902 of FIG. 9 generates new unseen data samples through rules or machine learning models. Data simulation or data is generated synthetically for applications or situations whereby the explicit or observed data is heterogeneous. In various embodiments, data simulation is performed using one or more computing steps, for example, taking one or more input as a vector of parameters, samples a series of internal states or latent variables, continuous or discrete, and then produces a data vector as an output. In various embodiments, Packaged AI 902 of FIG. 9 incorporates observations of the underlying process that generates the data and analyses of its characteristics or data distribution or information inherent to the data. In a non-limiting example, a web-based a retailer who discontinues old styles of a product and introduces new styles frequently, leading to styles with limited history. The new styles are different from the older styles, and it is hard to use their sales for prediction. In various embodiments, Packaged AI 902 of FIG. 9 incorporates one or assumptions of an underlying process, one or more assumptions that there are specific customer segments that have well defined preferences. The number of segments and their preferences are not known upfront. These factors are then all parametrized to build model of the buying process and simulate with seed values. In various embodiments, the parameters are then estimated through an optimization process. In alternative embodiments, when data is sparse, human or domain expert knowledge input is used in addition to the DL/ML model to productionize Packaged AI 902 of FIG. 9. This step could be prior to experimentation or post model-selection in the ML lifecycle. These inputs are used to triangulate final results, for example, in applications requiring custom form data extraction. In various embodiments, hints are captured along with the annotation for a single document. The Packaged AI 902 of FIG. 9 is trained not only to understand the structures, but also to triangulate based on hints thus providing superior functional user requirements, application objectives, or the like. In various embodiments, the said packaged AI is configured to learn and synthesize new data or model building by incorporating one or more additional data augmentation methods, including but not limited linear or non-linear interpolation, pattern mixing, pattern decomposition, similarity distances, clustering, multi-dimension scaling, K-nearest neighbor models, over-sampling minority class, under-sampling the majority class, combining under and oversampling, creation of ensembled balanced data sets, neural generative models, statistical generative models, copulas, the like, or combinations thereof.

In accordance with certain embodiments of the Packaged AI, a user may take the following steps to rapidly build an AI. The user will log into the platform to create a new project by selecting from a list of Packaged AI templates. Each template is for a specific use case like image classification, document information extraction, document Q&A, etc. The user opens the project to enter an automated multi-step ML application (hereinafter "Packaged AI app") and follow through to build the AI. The Packaged AI app is built for a specific AI use-case, which can be built on any computer and can be run in the platform. In a various embodiments, a Packaged AI app comprises one or more steps, including but not limited to: Import data; Prepare data; Train data, Evaluate data; and Export app. In various embodiments, the Packaged AI app can function in three modes: (1) Standalone/local mode (executable on any computer without any external dependencies); (2) Platform mode (executable within the platform's container which will let the app access the components of the platform; and (3) Downloaded AI mode (executable within a DOCKER container (e.g., Container 910 of FIG. 9)) on any computer. The image for the Downloaded AI mode may be downloaded from the platform (e.g., Factory 902 of FIG. 9). For the wizard to be used in the platform, the project is initialized with the Packaged AI app and the project type changes to a Packaged AI Project. In various embodiments, the Packaged AI app contains a collection of files that are organized in a specific structure to form a complete Packaged AI app. These files include, but not limited to, a configuration file that defines what container image to use, what library to install, and the environment variables to set up. One or more package file may contain specific configurations for the Packaged AI app.

Another aspect of the present disclosure includes an end-user application comprising UI components configured as building blocks of the Packaged AI app. A data scientist can use a long list of simple and complex pre-created UI components as simple XML tags. These XML tags can be configured with some custom attributes, and which will render without any frontend code like HTML, CSS, or JS. Then the data scientist can move on to write handlers for these UI components using a language they already know, Python. Handlers are snippets of Python code (backend for the Packaged AI app's business logic) that a data scientist can write to add and manage actions to the UI components they use in the Packaged AI app. In various embodiments, each UI component will have a watch attribute. This attribute is used to subscribe to the events generated by the component.

Figure 12:
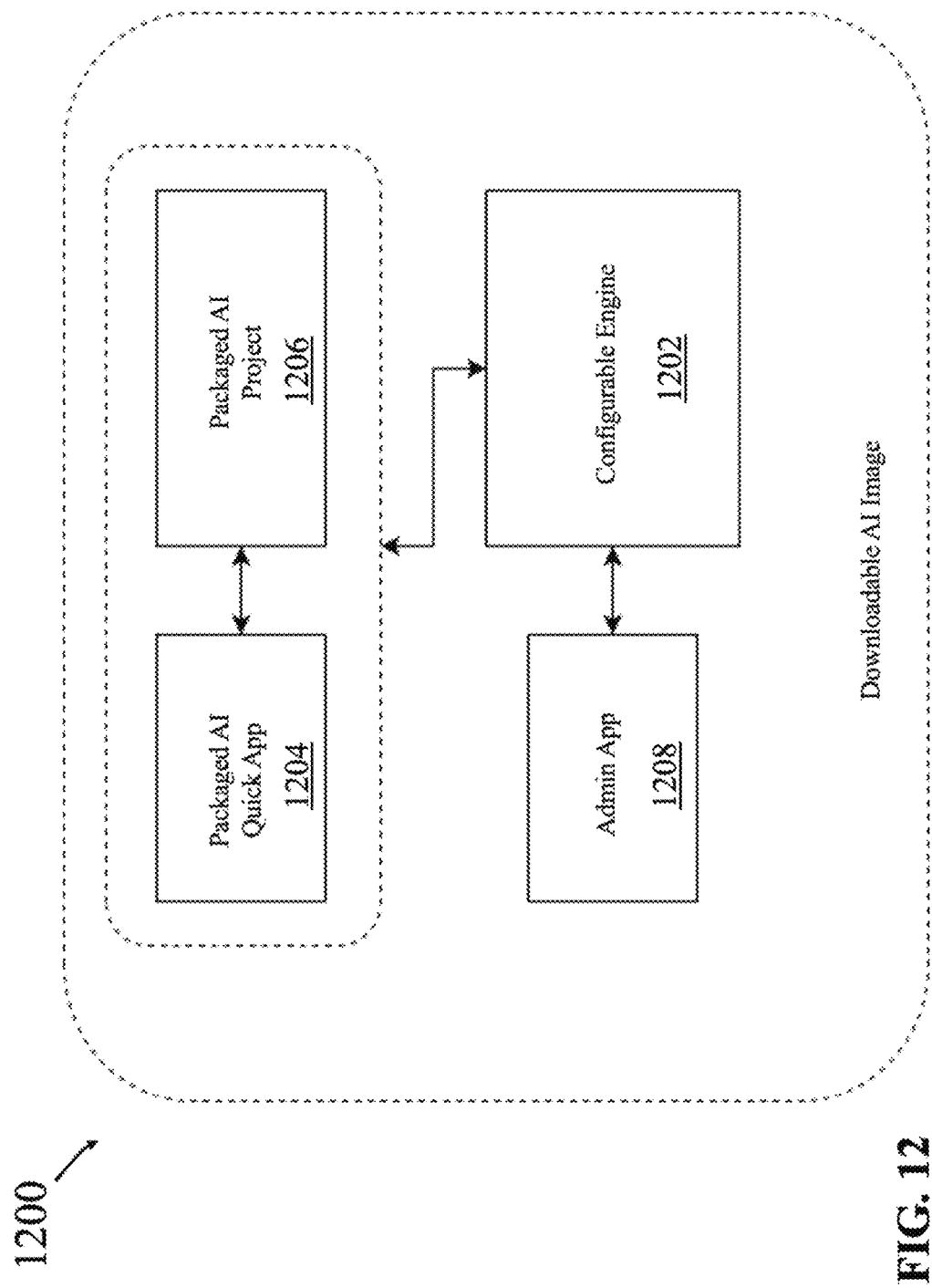
FIG. 12 is a functional block diagram of a downloadable AI image.

An AI product in accordance with certain aspects of the present disclosure comprises a Downloadable AI designed to provide a canned or packaged solution, that can be downloaded by a customer (e.g., end user of the Packaged AI app) and deployed in a chosen environment. This technology enables the business users (e.g., 908 of FIG. 9) to leverage the AI Solutions built on the platform (e.g., 902 of FIG. 9) within their business process. Referring now to FIG. 12, a downloadable AI (DOCKER) image 1200 is shown. In various embodiments, the DOCKER image comprises a Configuration Engine 1202, a Packaged AI Quick App 1204, a Packaged AI Project Artefacts folder 1206, and an Admin App 1208. Configuration 1202 can be a built-in execution environment capable of running one or more pipeline disclosed herein. In a preferred embodiment, Downloadable AI image 1200 contains one or more pipelines or models required for executing an AI product or solution. In one embodiment, Packaged AI Quick App 1204 is designed and built using said Packaged AI UI. In various embodiments, upon building a Downloadable AI Image 1202, user 908 of FIG. 9 can export one or more specific pages from the Packaged AI Quick App 1204 to the Downloaded AI image 1202. The user typically exports the evaluate screens associated with the Packaged AI Quick App 1204 with an assumption that the Downloaded AI Image 1204 will run on small servers and will not have the necessary resources to train the AI, thus leveraging all training will happen on Packaged AI 902 of FIG. 9. In another embodiment, the Packaged AI Project Artefacts folder 1206 contains one or more artefacts including but not limited to the pipelines, ML models, and blocks, disclosed herein, required to run the Packaged AI Quick App 1204. The appropriate pipelines and blocks from AiOS 904 of FIG. 9 are exported based on the users configuration and placed in the Packaged AI Project 1206 artefacts location. In yet another embodiment, the Admin App 1208 comprises one or more configurable elements of the Downloadable AI 1200. In various embodiments, the Admin App 1208 enables user 908 of FIG. 9 to configure the following details, including but not limited to, data sources, storage and logging locations, license-based settings, etc. In various embodiments, the Downloadable AI Image 1204 enables the deployment of an AI product as a microservice, rather than a full application, in a thin portable container, with a small performance footprint, suitable for deployment on heterogeneous, resource limited, and power limited computational units.

Figure 13:
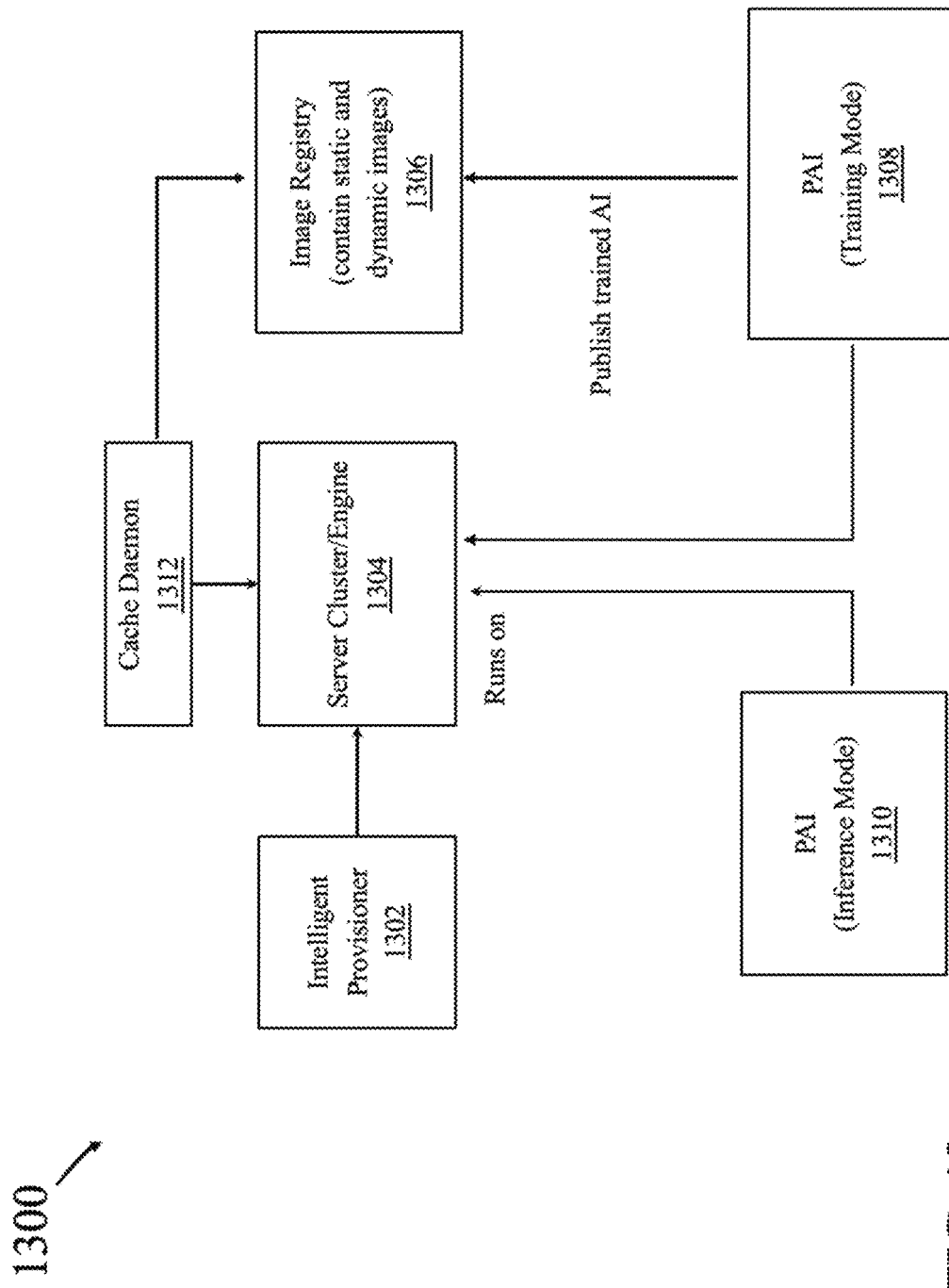
FIG. 13 is a function block diagram of a hybrid persistent on-demand container orchestration computing architecture, in accordance with certain aspects of the present disclosure.

Another aspect of the present disclosure includes incorporate a hybrid persistent on-demand Package AI container orchestration system. One of the key challenges with a cloud deployment is management of costs. Packaged AIs require different images/codebases for each tenant and each instance. In general, the images/codebases are large, and take an inordinate amount of time to provision, thus making it extremely difficult to allocate them on-demand and elastically. Having fully built images on standby are expensive. Spot instances cannot be used for these purposes since it is not possible to rapidly instantiate a backup when a primary goes down. To optimize costs, it is logical to provision on-demand or spot instances when a user requests for a packaged AI (via a REST API request or opening up the user interface). However, the images (OS, packages, codebase, trained models) are large, ranging from 5-10 GB. Some trained models themselves consume over 1 GB. This implies a delay of 1-10 minutes depending on the chosen infrastructure when running on-demand or spot instances, which leads to a poor user experience. Referring to FIG. 13 a hybrid persistent on-demand container orchestration computing architecture 1300 is shown. The container orchestration computing architecture comprises an intelligent provisioning module 1302 that monitors one or more cloud computing environment further comprising one or more server/cluster engine 1304 and executes one or methods to configure on-demand and spot instance provision one or more containers (e.g., container 910 of FIG. 9) for AI product deployment. The containers reside within one or more Image Registry 1306 of one or more container technologies, including but not limited to, Linux Container (LXC), OpenVZ, Windows Hyper-V Container, DOCKER, Windows Server Container, rkt, LXD, Oracle Solaris Container, Amazon EC2 Container Service, Google Container Engine, Microsoft Azure Container Service, Joyent Triton, Kubernetes, Swarm, Marathon, Cloudify. In various embodiments, Image Registry 1306 contains one or static and dynamic images. The images comprise one or more delineation of a Packaged AI (e.g., Packaged AI 902) into a static and dynamic structures; preferably on average into an 85/15 or a 90/10 split. In various embodiments, the images are updated by one or more published trained AI 1310. In various embodiments, at least one published trained AI 1308 and one or more published inference mode AI 1310 are running on at least one server/cluster engine 1304. A Cache Daemon 1312 monitors server/cluster engine 1304, cloud computing communication traffic, loads, disposes reverse pods or containers, and coordinates the configuration of static and dynamic structures. One or more pod/container may be repurposed to move from one Package AI instance to another. In various embodiments, Cache Daemon 1312 communicates with one or more container technology daemon (for example, Docker Daemon) to request, intercept, redirect, or receive one or more input, to coordinate the configuration of images 1308, via an API Interface. In various embodiments, Cache Daemon 1312 forks one or more child process. In various embodiments, Cache Daemon 1312 requests, intercepts, redirects, or receives one or more input for processing transparently using at least one container resources, including but not limited to Mount, UTS, IPC, PID, User, Network namespaces, the like, or combinations thereof.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random-access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general-purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions (i.e., computer-executable instructions) may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s). Computer-executable instructions may be in many forms, such as program modules, executed by one or more computers or other devices. Generally, program modules include routines, programs, objects, components, data structures, etc. that perform tasks or implement abstract data types. Typically, the functionality of the program modules may be combined or distributed as desired in various embodiments.

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts to carry out an embodiment of the invention.

As the phrases are used herein, a processor may be "operable to" or "configured to" perform a certain function in a variety of ways, including, for example, by having one or more general-purpose circuits perform the function by executing computer-executable program code embodied in computer-readable medium, and/or by having one or more application-specific circuits perform the function.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor but may be distributed in a modular fashion amongst several different computers or processors to implement various aspects of the present technology.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." As used herein, the terms "right," "left," "top," "bottom," "upper," "lower," "inner" and "outer" designate directions in the drawings to which reference is made.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention.

What is claimed is:

1. A computer system, comprising:
   at least one computer processor configured to execute computer program instructions; and
   a non-transitory computer-readable memory device communicably engaged with the at least one computer processor and having computer program instructions stored thereon that, when executed, cause the at least one computer processor to perform operations comprising:
   providing a graphical user interface within an end-user application to an end user, the graphical user interface comprising one or more interface elements for selecting a template for at least one pre-configured machine learning framework,
   wherein the template for the at least one pre-configured machine learning framework comprises one or more computing tasks encapsulated as one or more objects within one or more blocks within an object-oriented programing framework, the one or more blocks comprising a topology of a data processing pipeline or workflow for the at least one pre-configured machine learning framework;
   providing, in response to a first user-generated input, the template for the at least one pre-configured machine learning framework, wherein the template comprises one or more interface elements for configuring the at least one pre-configured machine learning framework;

processing, in response to a second user-generated input, a training dataset for the at least one pre-configured machine learning framework;

providing, to the end user via the graphical user interface, one or more data visualizations for the training dataset and one or more interface elements for preparing one or more data elements for the training dataset;

training, in response to a third user-generated input, at least one machine learning pipeline according to the training dataset;

providing, to the end user via the graphical user interface, one or more interface elements for evaluating the at least one machine learning pipeline; and storing the at least one machine learning pipeline in at least one software component comprising a container.

2. The system of claim 1 wherein the operations further comprise exporting the container comprising the at least one machine learning pipeline to at least one cloud computing environment.

3. The system of claim 2 wherein the at least one cloud computing environment comprises a serving core for the at least one machine learning pipeline.

4. The system of claim 1 wherein the one or more interface elements for preparing the one or more data elements for the training dataset comprise one or more interface elements for configuring the one or more data elements according to at least one use-case for the at least one machine learning pipeline.

5. The system of claim 4 wherein the one or more interface elements for preparing the one or more data elements for the training dataset comprise one or more interface elements for configuring a data processing pipeline for the at least one machine learning pipeline.

6. The system of claim 1 wherein the operations further comprise providing, to the end user via the graphical user interface, one or more interface elements for configuring one or more training metrics for the at least one machine learning pipeline according to at least one use-case.

7. The system of claim 1 wherein the one or more interface elements for evaluating the at least one machine learning pipeline comprise one or more interface elements for uploading an evaluation dataset.

8. The system of claim 7 wherein the operations further comprise processing the evaluation dataset according to the at least one machine learning pipeline.

9. The system of claim 8 wherein the one or more interface elements for evaluating the at least one machine learning pipeline comprise one or more interface elements for evaluating one or more model outputs of the least one machine learning pipeline according to at least one use-case.

10. The system of claim 2 wherein the container comprises at least one container image.

11. A computer-implemented method, comprising:
providing, with at least one computer processor, a graphical user interface within an end-user application to an end user, the graphical user interface comprising one or more interface elements for selecting a template for at least one pre-configured machine learning framework, wherein the template for the at least one pre-configured machine learning framework comprises one or more computing tasks encapsulated as one or more objects within one or more blocks within an object-oriented programing framework, the one or more blocks comprising a topology of a data processing pipeline or workflow for the at least one pre-configured machine learning framework;

providing, with the at least one computer processor in response to a first user-generated input, the template for the at least one pre-configured machine learning framework, wherein the template comprises one or more interface elements for configuring the at least one pre-configured machine learning framework;

processing, with the at least one computer processor in response to a second user-generated input, a training dataset for the at least one pre-configured machine learning framework;

providing, with the at least one computer processor, one or more data visualizations for the training dataset and one or more interface elements for preparing one or more data elements for the training dataset to the end user via the graphical user interface;

training, with the at least one computer processor in response to a third user-generated input, at least one machine learning pipeline according to the training dataset;

providing, with the at least one computer processor, one or more interface elements for evaluating the at least one machine learning pipeline to the end user via the graphical user interface; and storing, with the at least one computer processor communicably engaged with at least one non-transitory computer readable medium, the at least one machine learning pipeline in at least one software component comprising a container.

12. The method of claim 11 further comprising exporting, with the at least one computer processor, the container comprising the at least one machine learning pipeline to at least one cloud computing environment.

13. The method of claim 12 wherein the at least one cloud computing environment comprises a serving core for the at least one machine learning pipeline.

14. The method of claim 11 wherein the one or more interface elements for preparing the one or more data elements for the training dataset comprise one or more interface elements for configuring the one or more data elements according to at least one use-case for the at least one machine learning pipeline.

15. The method of claim 14 wherein the one or more interface elements for preparing the one or more data elements for the training dataset comprise one or more interface elements for configuring a data processing pipeline for the at least one machine learning pipeline.

16. The method of claim 11 further comprising providing, with the at least one computer processor, one or more interface elements for configuring one or more training metrics for the at least one machine learning pipeline according to at least one use-case to the end user via the graphical user interface.

17. The method of claim 11 wherein the one or more interface elements for evaluating the at least one machine learning pipeline comprise one or more interface elements for uploading an evaluation dataset.

18. The method of claim 17 further comprising processing, with the at least one computer processor, the evaluation dataset according to the at least one machine learning pipeline.

19. The method of claim 18 wherein the one or more interface elements for evaluating the at least one machine learning model comprise one or more interface elements for evaluating one or more model outputs of the least one machine learning pipeline according to at least one use-case.

20. A non-transitory computer-readable medium storing executable computer program instructions, the instructions executable to command at least one processor to perform operations comprising:

provteding a graphical user interface within an end-user application to an end user, the graphical user interface comprising one or more interface elements for selecting a template for at least one pre-configured machine learning framework, wherein the template for the at least one pre-configured machine learning framework comprises one or more computing tasks encapsulated as one or more objects within one or more blocks within an object-oriented programing framework, the one or more blocks comprising a topology of a data processing pipeline or workflow for the at least one pre-configured machine learning framework;

providing, in response to a first user-generated input, the template for the at least one pre-configured machine learning framework, wherein the template comprises one or more interface elements for configuring the at least one pre-configured machine learning framework;

processing, in response to a second user-generated input, a training dataset for the at least one pre-configured machine learning framework;

providing, to the end user via the graphical user interface, one or more data visualizations for the training dataset and one or more interface elements for preparing one or more data elements for the training dataset;

training, in response to a third user-generated input, at least one machine learning pipeline according to the training dataset;

providing, to the end user via the graphical user interface, one or more interface elements for evaluating the at least one machine learning pipeline; and storing the at least one machine learning pipeline in at least one software component comprising a container.

* * * * *